United States Patent
Liu et al.

(10) Patent No.: US 12,457,352 B2
(45) Date of Patent: Oct. 28, 2025

(54) REGRESSION-BASED MOTION VECTOR FIELD BASED SUB-BLOCK MOTION VECTOR DERIVATION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN)

(73) Assignees: BEIJING BYTEDANCE NEWTORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 509 days.

(21) Appl. No.: 17/405,421

(22) Filed: Aug. 18, 2021

(65) Prior Publication Data
US 2021/0385483 A1  Dec. 9, 2021

Related U.S. Application Data

(63) Continuation of application No. PCT/CN2020/076927, filed on Feb. 27, 2020.

(30) Foreign Application Priority Data

Feb. 27, 2019  (WO) ................ PCT/CN2019/076300

(51) Int. Cl.
*H04N 19/513* (2014.01)
*H04N 19/176* (2014.01)

(52) U.S. Cl.
CPC ......... *H04N 19/513* (2014.11); *H04N 19/176* (2014.11)

(58) Field of Classification Search
CPC .... H04N 19/176; H04N 19/513; H04N 19/52; H04N 19/537
See application file for complete search history.

(56) References Cited

U.S. PATENT DOCUMENTS 10,958,934 B2 * 3/2021 Li ......................... H04N 19/139
11,102,476 B2 * 8/2021 Huang ................. H04N 19/423
(Continued)

FOREIGN PATENT DOCUMENTS

CN   106537915 A   3/2017
CN   108432250 A   8/2018
(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
(Continued)

*Primary Examiner* — Peter D Le
(74) *Attorney, Agent, or Firm* — Conley Rose, P.C.

(57) ABSTRACT

Devices, systems and methods for digital video coding, which includes deriving RMVF-based motion vector information, are described. An exemplary method for video processing includes deriving at least one motion model for a current video block, based on motion information of at least one non-adjacent spatial neighboring block or at least one temporal neighboring block of the current video block; deriving motion information for the current video block or at least one sub-block of the current video block based on the at least one motion model; and performing a conversion for the current video block based on the derived motion information.

20 Claims, 23 Drawing Sheets

(56) References Cited

U.S. PATENT DOCUMENTS

| | | | |
|---|---|---|---|
| 11,546,605 B2* | 1/2023 | Lee | H04N 19/139 |
| 2002/0034250 A1* | 3/2002 | Yoo | H04N 19/537 |
| | | | 375/240.16 |
| 2003/0138150 A1* | 7/2003 | Srinivasan | H04N 19/154 |
| | | | 375/E7.199 |
| 2004/0156435 A1* | 8/2004 | Itoh | H04N 19/557 |
| | | | 375/E7.118 |
| 2004/0190616 A1* | 9/2004 | Linzer | H04N 19/51 |
| | | | 375/240.12 |
| 2005/0013364 A1* | 1/2005 | Hsu | H04N 19/533 |
| | | | 375/E7.118 |
| 2005/0053294 A1* | 3/2005 | Mukerjee | H04N 19/51 |
| | | | 375/E7.125 |
| 2006/0045365 A1 | 3/2006 | De Haan | |
| 2007/0286286 A1* | 12/2007 | Heng | H04N 19/40 |
| | | | 375/E7.092 |
| 2008/0043831 A1* | 2/2008 | Sethuraman | G10L 19/173 |
| | | | 375/240 |
| 2008/0126278 A1* | 5/2008 | Bronstein | H04N 19/567 |
| | | | 706/17 |
| 2016/0366367 A1 | 12/2016 | Chen | |
| 2017/0214932 A1 | 7/2017 | Huang | |
| 2017/0332095 A1* | 11/2017 | Zou | H04N 19/537 |
| 2018/0098063 A1 | 4/2018 | Chen et al. | |
| 2018/0278951 A1* | 9/2018 | Seregin | H04N 19/70 |
| 2018/0310017 A1* | 10/2018 | Chen | H04N 19/52 |
| 2018/0359483 A1 | 12/2018 | Chen et al. | |
| 2019/0230361 A1* | 7/2019 | Zhang | H04N 19/537 |
| 2019/0335191 A1* | 10/2019 | Kondo | H04N 19/85 |
| 2019/0385276 A1* | 12/2019 | Kondo | G06T 5/50 |
| 2020/0077111 A1* | 3/2020 | Chuang | H04N 19/513 |
| 2020/0154135 A1* | 5/2020 | Lee | H04N 19/176 |
| 2020/0186820 A1* | 6/2020 | Park | H04N 19/423 |
| 2020/0260108 A1* | 8/2020 | Chen | H04N 19/82 |
| 2021/0281855 A1* | 9/2021 | Skupin | H04N 19/109 |
| 2021/0360273 A1* | 11/2021 | Robert | H04N 19/176 |
| 2022/0182657 A1* | 6/2022 | Yang | H04N 19/513 |

FOREIGN PATENT DOCUMENTS

| | | |
|---|---|---|
| CN | 108605137 A | 9/2018 |
| CN | 109155855 A | 1/2019 |
| EP | 3422720 A1 | 1/2019 |
| JP | 2010033532 A | 2/2010 |
| WO | 2017200771 A1 | 11/2017 |
| WO | 2018126163 A1 | 7/2018 |
| WO | 2019002215 A1 | 1/2019 |

OTHER PUBLICATIONS

Ghaznavi-Youvalari et al. ""CE4-related: Merge Mode with Regression Based Motion Vector Field (RMVF),"" Joint Video Experts Team (JVET)of ITU-T SG 16 WP 3 and ISO/IEC JTC 1/SC 29/WG 1112th Meeting: Macao, CN, Oct. 3-12, 2018, document JVET-L0171, 2018.

Ghaznavi-Youvalari et al. ""CE2: Merge Mode with Regression-based Motion Vector Field (Test 2.3.3),"" Joint Video Experts Team (JVET)of ITU-T SG 16 WP 3 and ISO/IEC JTC 1/SC 29/WG 1113th Meeting: Marrakech, MA, Jan. 9-18, 2019, document JVET-M0302, 2019.

Han et al. "CE4.1.3: Affine Motion Compensation Prediction," Joint Video Exploration Team (JVET) of ITU-T SG 16 WP 3 and ISO/IEC JTC 1/SC 29/WG 11, 11th meeting, Ljubljana, SI, Jul. 10-18, 2018, document JVET-K0337, 2018.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Li et al. "An Efficient Four-Parameter Affine Motion Model for Video Coding," IEEE Transactions on Circuits and Systems for Video Technology, Aug. 2018, 28(8):1934-1948.

Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.

http:/phenix.it-sudparis.eu/jvet/doc_end_user/current_document.php?id=5755.

https://vcgit.hhi.fraunhofer.de/jvet/VVCSoftware_VTM/tags/VTM-4.0.

JEM-7.0: https://jvet.hhi.fraunhofer.de/svn/svn_HMJEMSoftware/tags/ HM-16.6-JEM-7.0.

International Search Report and Written Opinion from International Patent Application No. PCT/CN2019/076927 dated May 27, 2020 (12 pages).

Chinese Office Action from Chinese Patent Application No. 202080017067.X dated Aug. 1, 2024, 11 pages.

Chinese Notice of Allowance from Chinese Patent Application No., 202080017067.X dated May 12, 2025, 6 pages.

* cited by examiner 6-parameter affine model 4-parameter affine model

REGRESSION-BASED MOTION VECTOR FIELD BASED SUB-BLOCK MOTION VECTOR DERIVATION This application is a continuation of International Application No. PCT/CN2020/076927, filed on Feb. 27, 2020, which claims the priority to and benefit of International Patent Applications PCT/CN2019/076300, filed on Feb. 27, 2019. The entire disclosures of the aforementioned applications are incorporated by reference as part of the disclosure of this application.

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to deriving motion vectors are described. The described methods may be applied to existing video coding standards (e.g., High Efficiency Video Coding (HEVC) or Versatile Video Coding) and future video coding standards or video codecs.

In one representative aspect, there is disclosed a method for video processing, comprising: deriving at least one motion model for a current video block, based on motion information of at least one non-adjacent spatial neighboring block or at least one temporal neighboring block of the current video block; deriving motion information for the current video block or at least one sub-block of the current video block based on the at least one motion model; and performing a conversion for the current video block based on the derived motion information.

In another representative aspect, there is disclosed a method for video processing, comprising: deriving, one or more control point motion vector predictors (CPMVPs) of an affine model for a current video block, from at least one set of neighboring blocks in a regression-based motion vector field (RMVF) scheme; updating a motion candidate list for the current video block based on the one or more CPMVPs, wherein the one or more CPMVPs are associated with a specific affine motion mode; and performing a conversion for the current video block based on the motion candidate list.

In still another representative aspect, there is disclosed a method for video processing, comprising: deriving at least one set of affine parameters of an affine model for a current video block by utilizing a regression-based motion vector field (RMVF) scheme at least based on at least one set of motion information stored in a lookup table; performing a conversion for the current video block based on the at least one set of affine parameters.

In yet another representative aspect, there is disclosed a method for video processing, comprising: maintaining for a current video block, an affine motion candidate list which includes a plurality of affine motion candidates, wherein the current video block is coded in affine mode; reordering the plurality of affine motion candidates in the affine motion candidate list based on at least one set of motion information associated with one or more blocks converted previously to update the affine motion candidate list; and performing a conversion for the current video block based on the updated affine motion candidate list.

Further, in a representative aspect, any one or more of the disclosed methods is an encoder-side implementation.

Also, in a representative aspect, any one or more of the disclosed methods is a decoder-side implementation.

One or more of the above-described methods are embodied in the form of processor-executable code and stored in a computer-readable program medium.

In yet another representative aspect, an apparatus in a video system comprising a processor and a non-transitory memory with instructions thereon is disclosed. The instructions upon execution by the processor, cause the processor to implement any one or more of the disclosed methods.

The above and other aspects and features of the disclosed technology are described in greater detail in the drawings, the description and the claims.

DETAILED DESCRIPTION

1. Video Coding in HEVC/H.265

Figure 1:
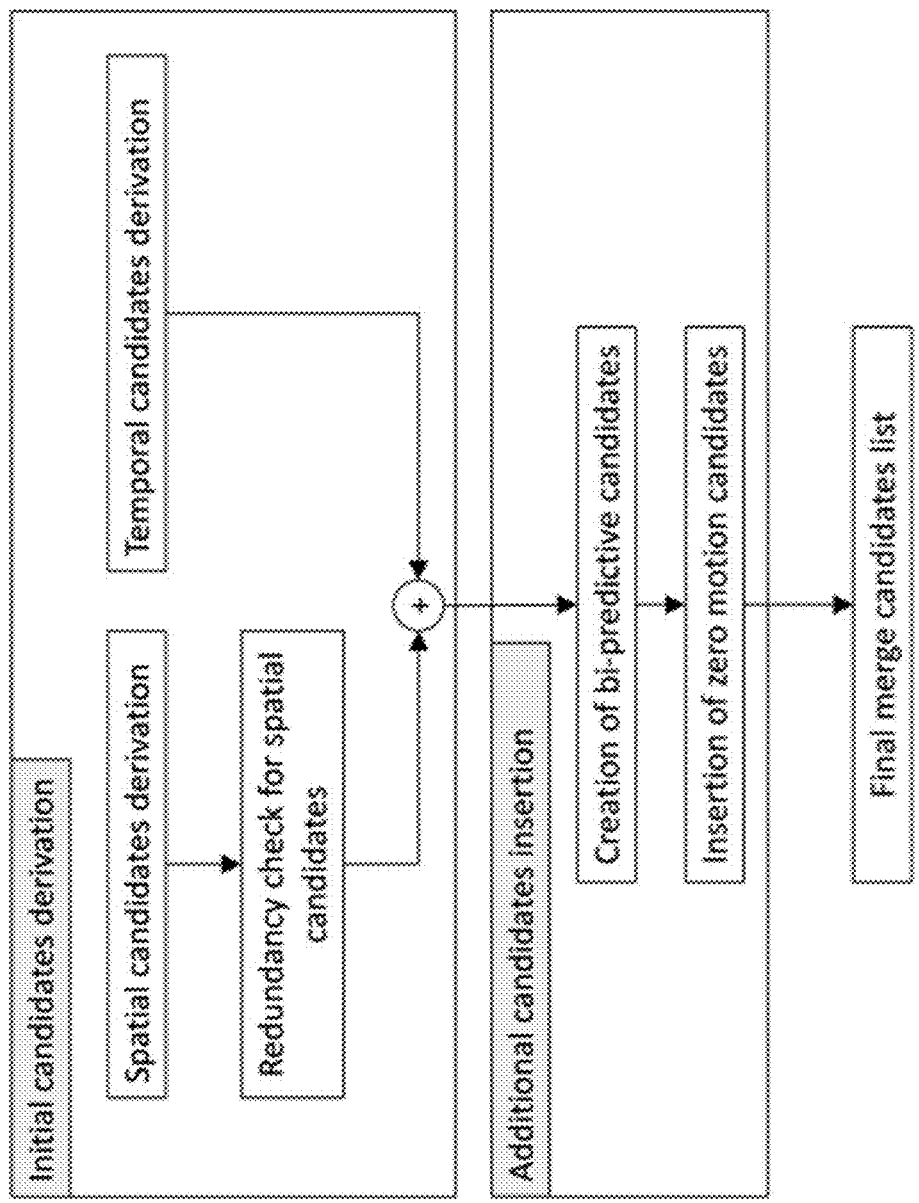
FIG. 1 shows an example of constructing a merge candidate list.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this patent document.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1. Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. Reference pictures included in List 0/1 can be from past and future pictures in terms of capturing/display order.

2.1.2. Merge Mode

2.1.2.1. Derivation of Candidate for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
        Step 1.1: Spatial candidates derivation
        Step 1.2: Redundancy check for spatial candidates
        Step 1.3: Temporal candidates derivation
    Step 2: Additional candidates insertion
        Step 2.1: Creation of bi-predictive candidates
        Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signaled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2. Spatial Candidates Derivation

Figure 2:
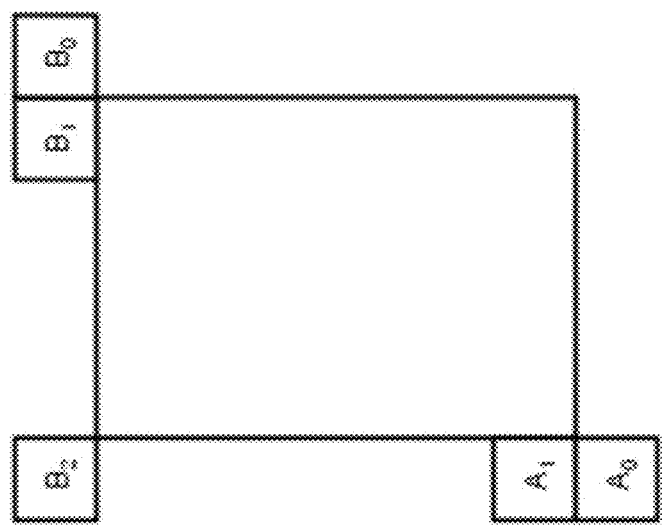
FIG. 2 shows an example of positions of spatial candidates.
Figure 3:
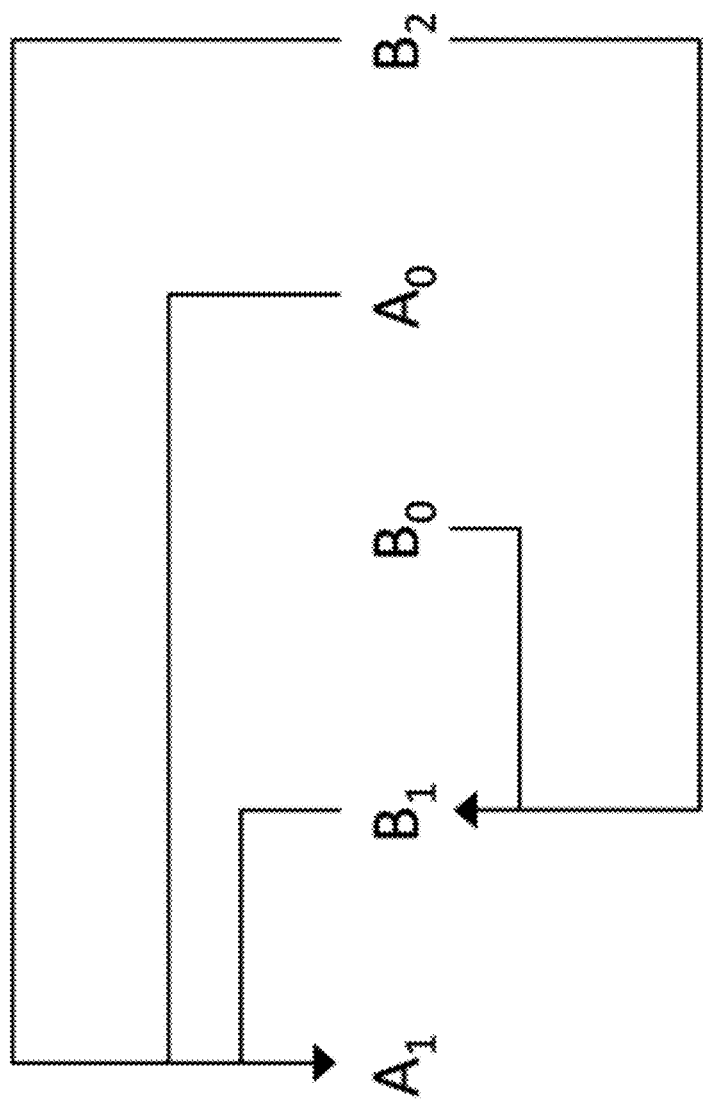
FIG. 3 shows an example of candidate pairs subject to a redundancy check of spatial merge candidates.
Figure 4B:
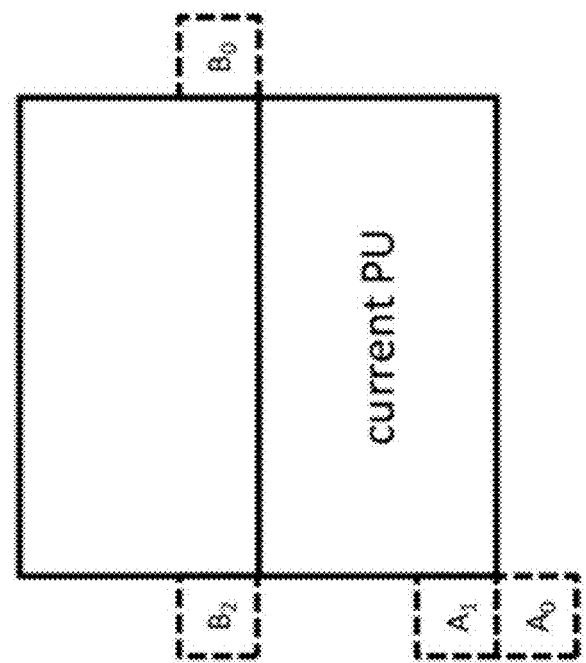
FIGS. 4A and 4B show examples of the position of a second prediction unit (PU) based on the size and shape of the current block.
Figure 4A:
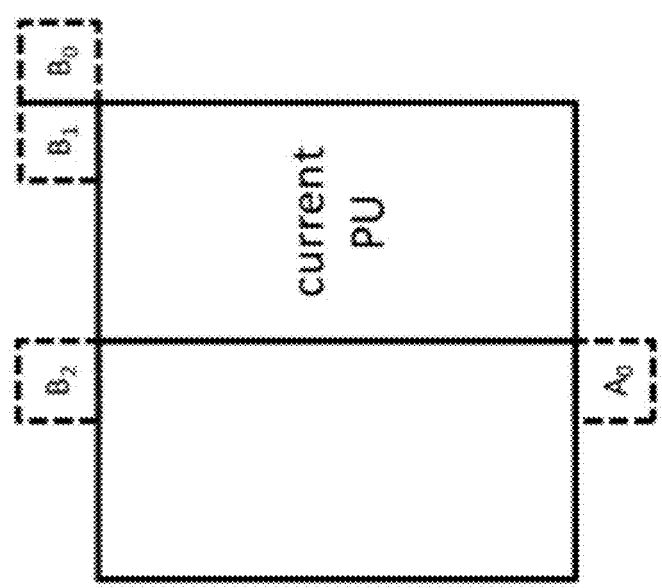

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIGS. 4A and 4B depict examples when the second PU is N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3. Temporal Candidates Derivation

Figure 5:
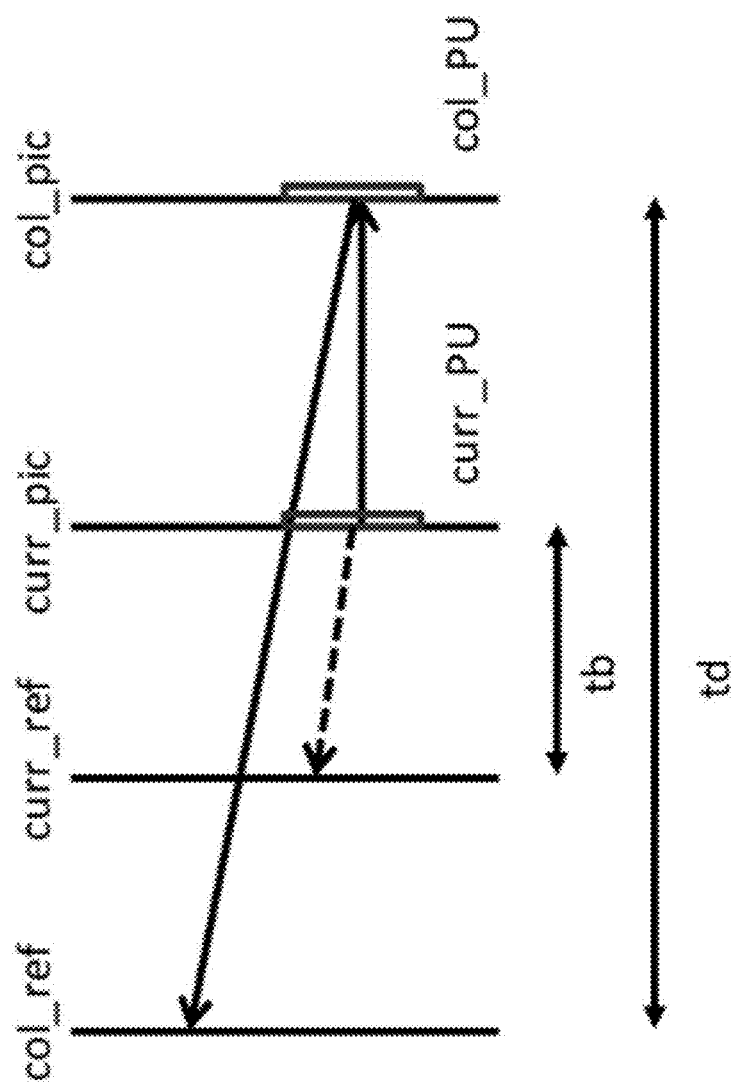
FIG. 5 shows an example of motion vector scaling for temporal merge candidates.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signaled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
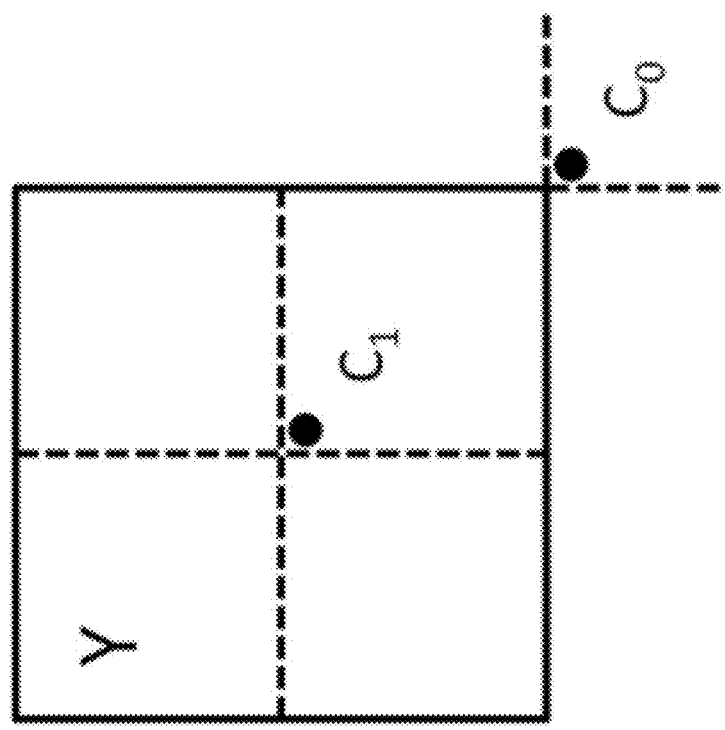
FIG. 6 shows an example of candidate positions for temporal merge candidates.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current coding tree unit (CTU a/k/a LCU, largest coding unit) row, position $C_1$ is used. Otherwise, position $C_0$ is used in the derivation of the temporal merge candidate.

2.1.2.4. Additional Candidates Insertion

Figure 7:
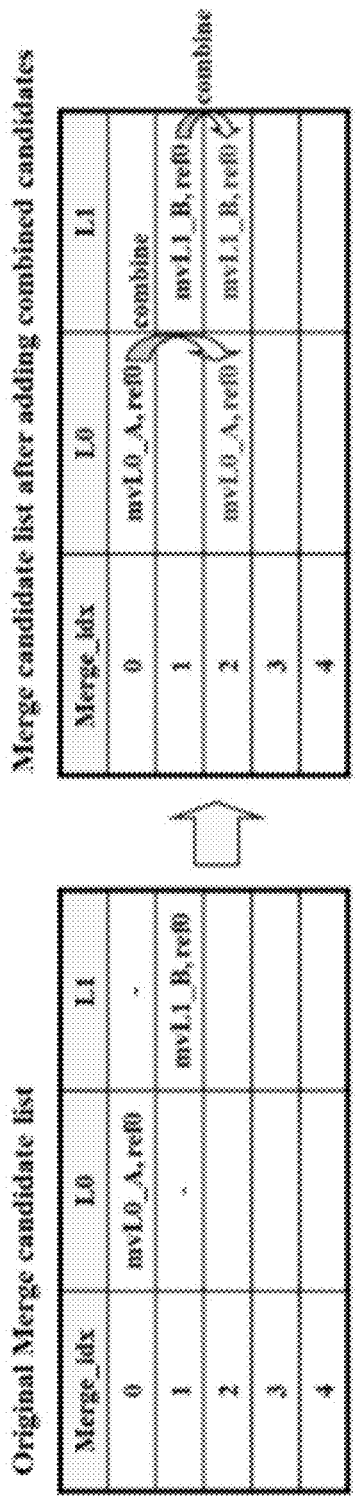
FIG. 7 shows an example of generating a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. Finally, no redundancy check is performed on these candidates.

2.1.3. AMVP

AMVP exploits spatio-temporal correlation of motion vector with neighboring PUs, which is used for explicit transmission of motion parameters. For each reference picture list, a motion vector candidate list is constructed by firstly checking availability of left, above temporally neighboring PU positions, removing redundant candidates and adding zero vector to make the candidate list to be constant length. Then, the encoder can select the best predictor from the candidate list and transmit the corresponding index indicating the chosen candidate. Similarly, with merge index signaling, the index of the best motion vector candidate is encoded using truncated unary. The maximum value to be encoded in this case is 2 (see FIG. 8). In the following sections, details about derivation process of motion vector prediction candidate are provided.

2.1.3.1. Derivation of AMVP Candidates

Figure 8:
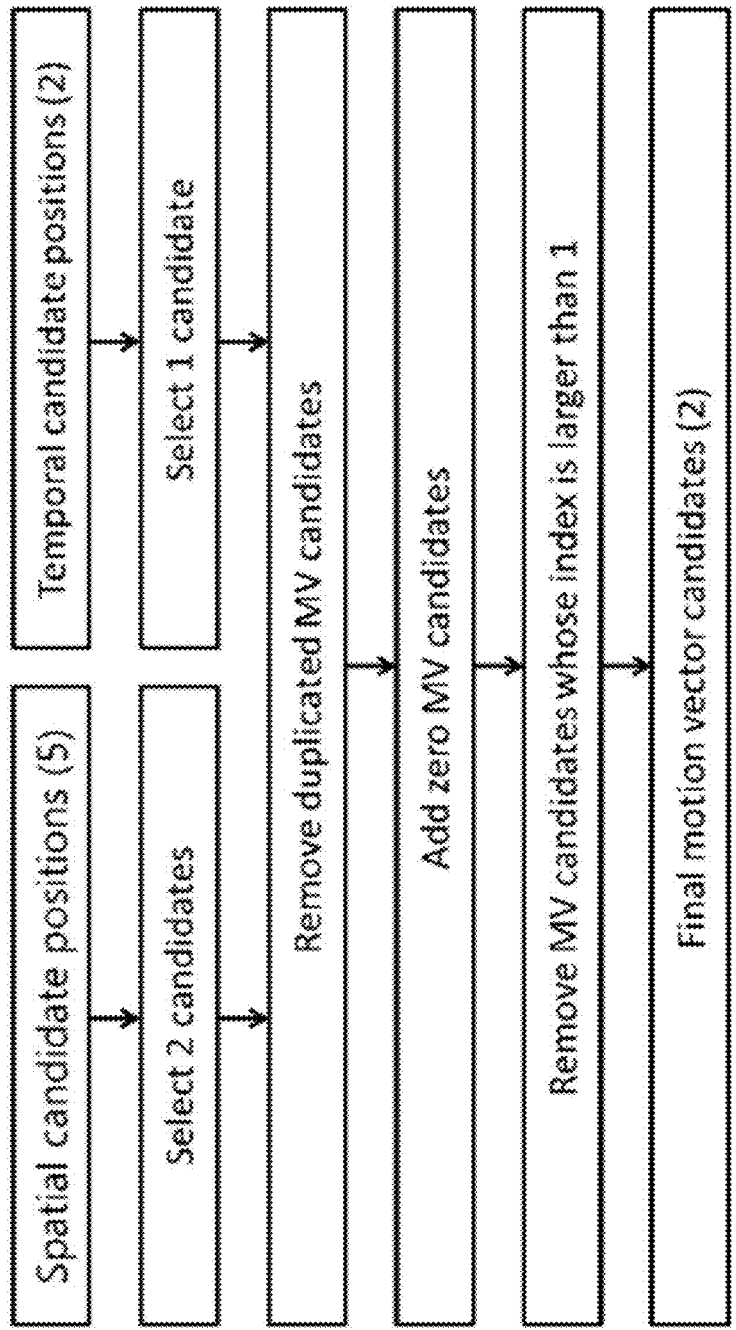
FIG. 8 shows an example of constructing motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2. Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
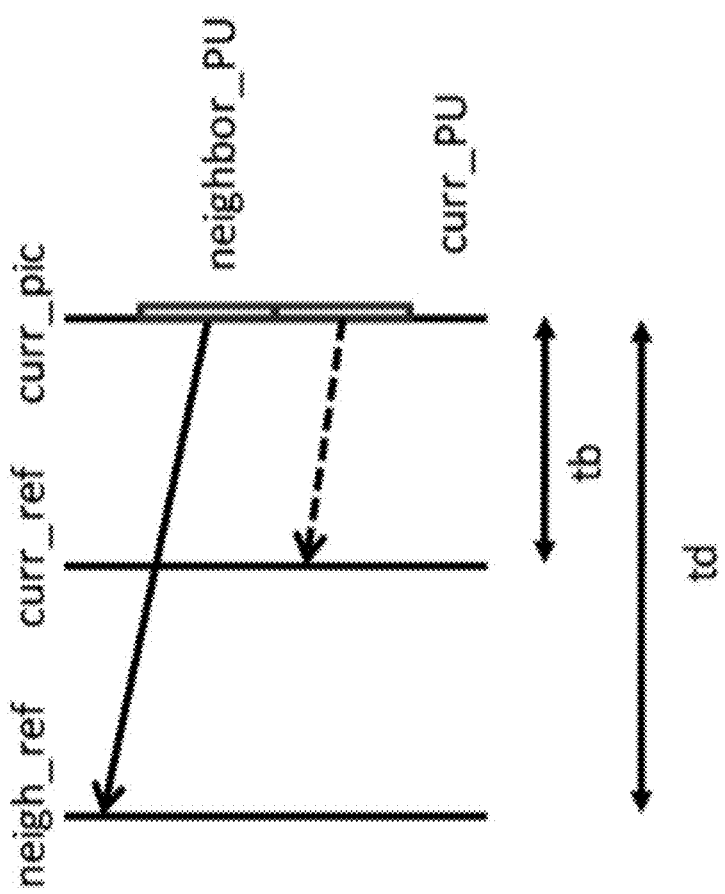
FIG. 9 shows an example of motion vector scaling for spatial motion vector candidates.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3. Temporal Motion Vector Candidates

Apart for the reference picture index derivation, all processes for the derivation of temporal merge candidates are the same as for the derivation of spatial motion vector candidates (see FIG. 6). The reference picture index is signaled to the decoder to indicate which reference picture are used.

2.2. Inter Prediction Methods in VVC

There are several new coding tools for inter prediction improvement, such as Adaptive motion vector difference resolution (AMVR) for signaling MVD, affine prediction mode, Triangular prediction mode (TPM), Advanced TMVP (ATMVP, aka SbTMVP), Generalized Bi-Prediction (GBI), Bi-directional Optical flow (BIO).

In VVC, a QuadTree/BinaryTree/MulitpleTree (QT/BT/TT) structure is adopted to divide a picture into square or rectangle blocks.

Besides QT/BT/TT, separate tree (a.k.a. Dual coding tree) is also adopted in VVC for I-frames. With separate tree, the coding block structure are signaled separately for the luma and chroma components.

2.2.1. History Based Motion Vector Prediction

Figure 10:
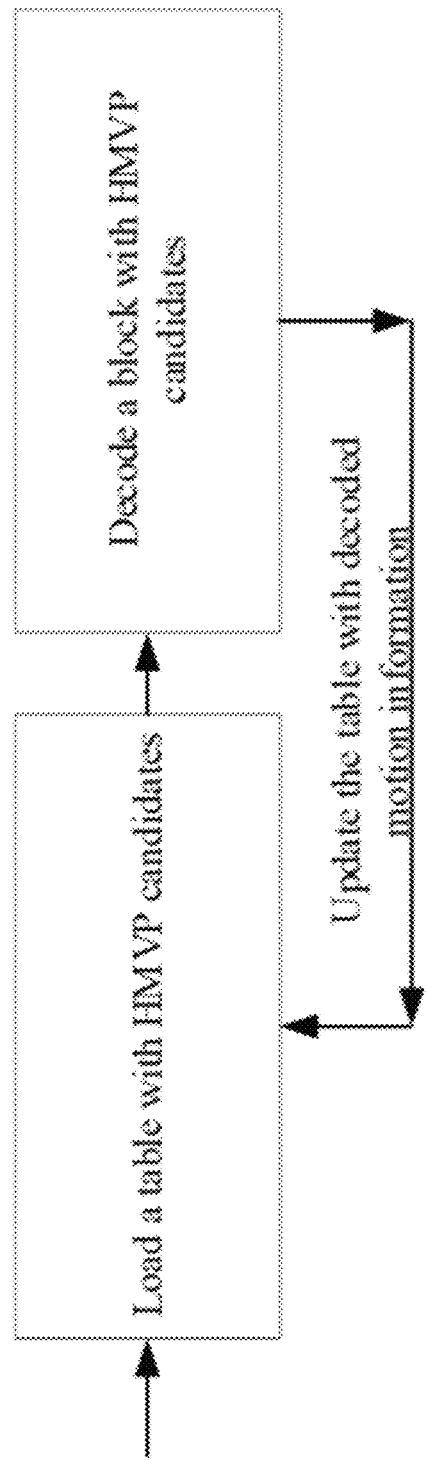
FIG. 10 shows an example of the coding flow for history-based motion vector prediction (HMVP) candidates.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 10.

In one example, the table size is set to be L (e.g., L=16 or 6, or 44), which indicates up to L HMVP candidates may be added to the table.

Figure 11:
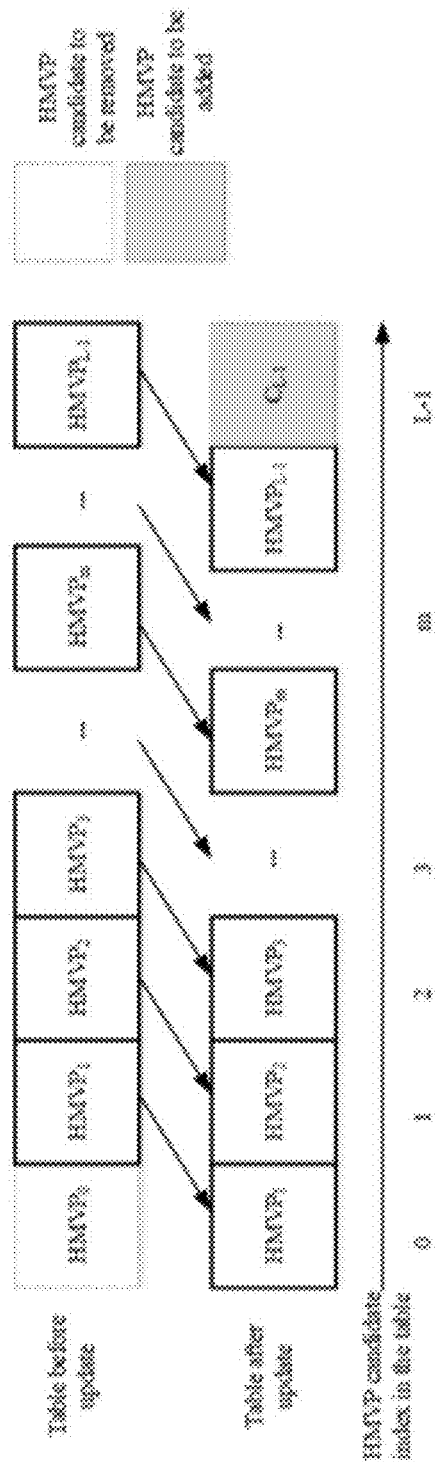
FIG. 11 shows an example of updating a table in the HMVP method.

1) In one embodiment, if there are more than L HMVP candidates from the previously coded blocks, a First-In-First-Out (FIFO) rule is applied so that the table always contains the latest previously coded L motion candidates. FIG. 11 depicts an example wherein the FIFO rule is applied to remove a HMVP candidate and add a new one to the table used in the proposed method.
2) In another embodiment, whenever adding a new motion candidate (such as the current block is inter-coded and non-affine mode), a redundancy checking process is applied firstly to identify whether there are identical or similar motion candidates in LUTs.

2.2.2. Sub-CU Based Motion Vector Prediction

Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.2.1. Alternative Temporal Motion Vector Prediction

Figure 12:
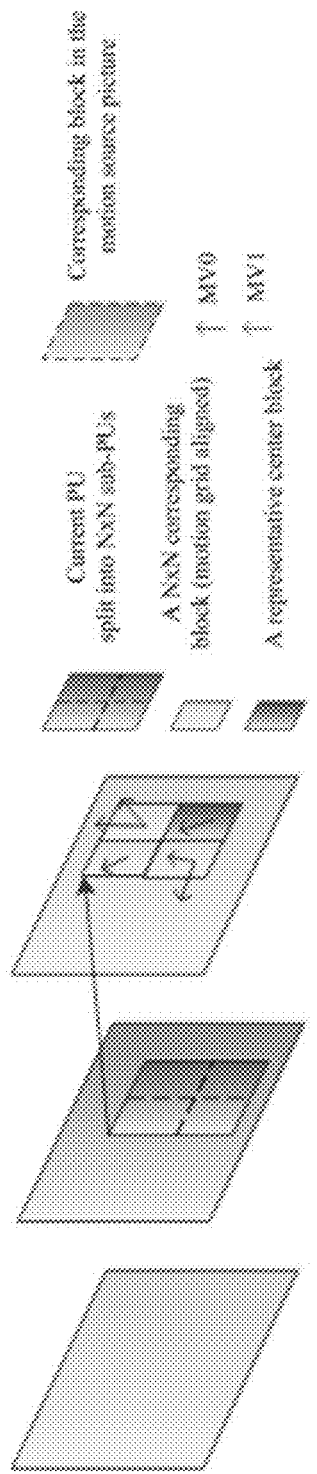
FIG. 12 shows an example of motion information prediction.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 12, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 12.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1-X) for each sub-CU.

2.2.3. Affine Motion Compensation Prediction

Figure 13:
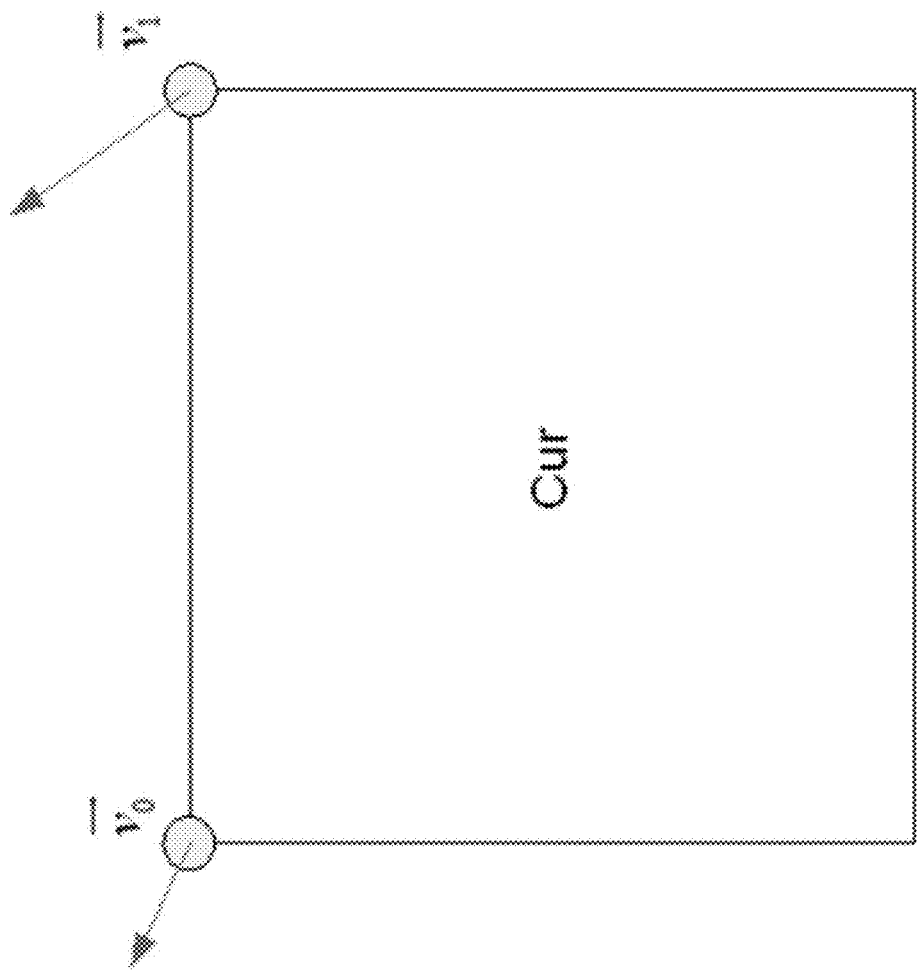
FIG. 13 shows an example of an affine motion model.

In HEVC, only translation motion model is applied for motion compensation prediction (MCP). While in the real world, there are many kinds of motion, e.g. zoom in/out, rotation, perspective motions and the other irregular motions. A simplified affine transform motion compensation prediction is applied. As shown FIG. 13, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

Figure 14:
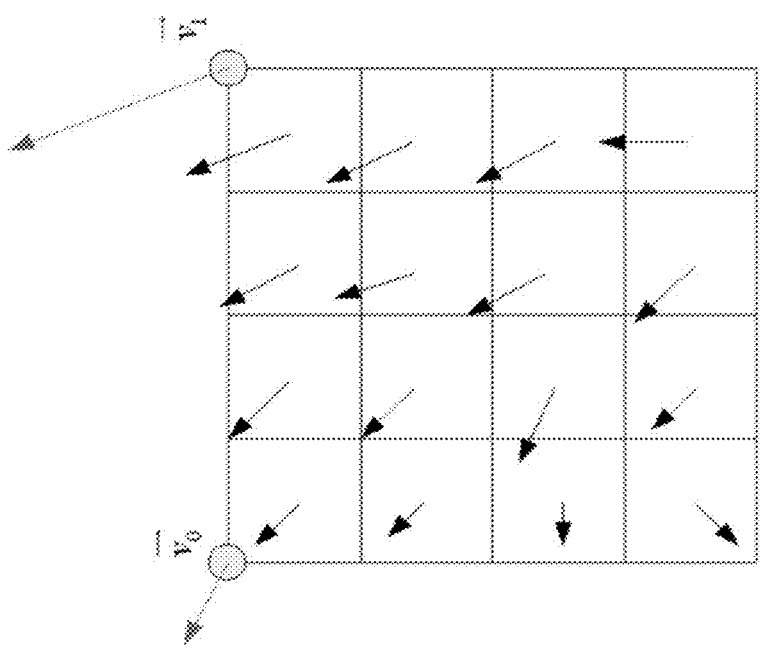
FIG. 14 shows an example of an affine motion vector field per sub-block.

To derive motion vector of each M×N sub-block, the motion vector of the center sample of each sub-block, as shown in FIG. 14, is calculated according to Equation 1, and rounded to 1/16 fraction accuracy.

There are two affine motion modes: AF_INTER mode and sub-block merge mode.

2.2.3.1. AF_INTER Mode

For CUs with both width and height larger than 8, AF_INTER mode can be applied. An affine flag in CU level is signalled in the bitstream to indicate whether AF_INTER mode is used. In AF_INTER mode, control point motion vector predictor (CPMVP) is derived in affine AMVP list. The coordinates of the 3 control points CP1, CP2 and CP3 is (0, 0), (W, 0) and (H, 0) respectively, where W and H are the width and height of current block.

Affine AMVP list is constructed with following steps:

1) Insert Inherited Affine AMVP Candidates

Figure 15:
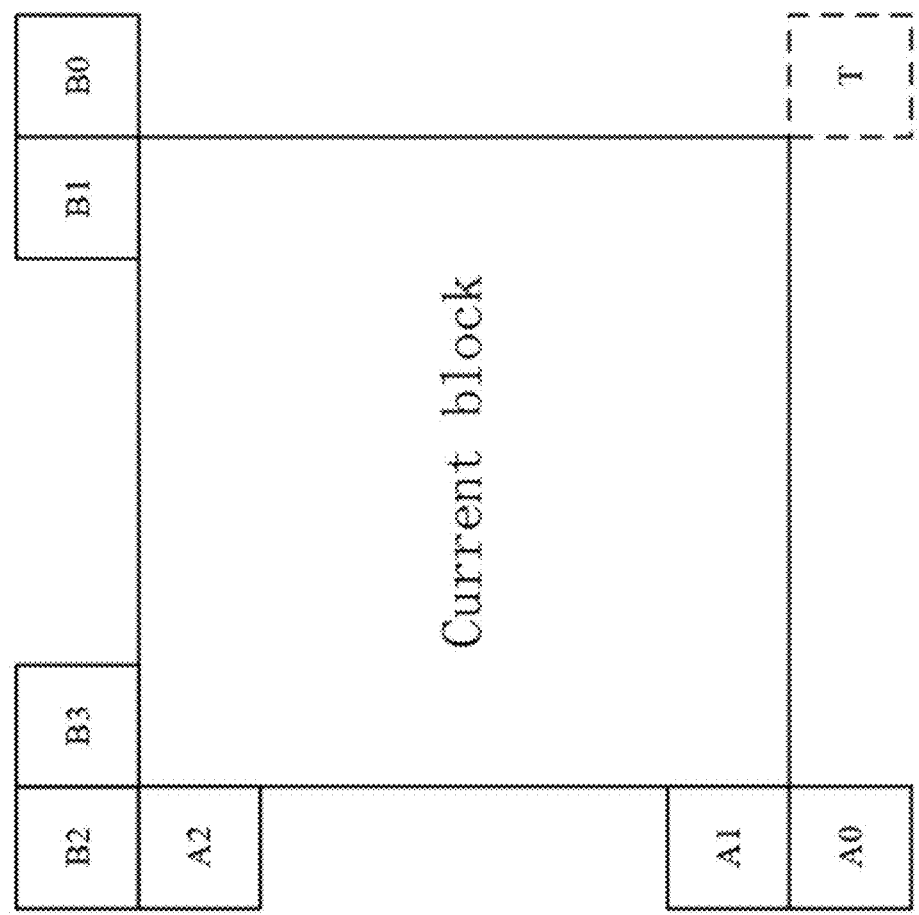
FIG. 15 shows example candidate positions for an affine merge mode.

Inherited affine candidate means that the candidate is derived from the affine motion model of its valid neighbor affine coded block. At most 2 candidates may be derived in this step. As shown in FIG. 15, A0, A1 are checked to generate the first candidate, and B0, B1, B2 are checked to generate the second candidate.

For each available candidate, its affine parameter is used to derive CPMVP, and the CPMVP is inserted into the affine AMVP list.

2) Insert Constructed Affine AMVP Candidates.

If the number of candidates in affine AMVP list is less than the maximum affine AMVP list size (denoted by MaxAffineAmvpListSize), constructed affine candidate is inserted into the candidate list. Constructed affine candidate means the CPMVP is constructed by combining the neighbor motion information of each control point.

The motion information for the control points is derived from the specified spatial neighbors shown in FIG. 15. CPk (k=1, 2, 3) represents the k-th control point. A0, A1, A2, B0, B1, B2 and B3 are spatial positions for predicting CPk (k=1, 2, 3).

The MVP of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

If MVP of CP1 and CP2 are available for 4-parameter affine model, or MVP of CP1, CP2 and CP3 are available for 6-parameter affine model, the CPMVP is inserted into the affine AMVP list.

If the number of candidates in affine AMVP list is still less than MaxAffineAmvpListSize, same MVP may be assigned to all control points as follows until size of the affine AMVP list is equal to MaxAffineAmvpListSize:

a) If MVP of CP2 is available, it is set as MVPs of CP1 and CP0, and such CPMVP is inserted into the affine AMVP list.

b) If MVP of CP1 is available, it is set as MVPs of CP0 and CP2, and such CPMVP is inserted into the affine AMVP list.

c) If MVP of CP0 is available, it is set as MVPs of CP1 and CP2, and such CPMVP is inserted into the affine AMVP list.

3) Padding with Zero Motion Vectors

If the number of candidates in affine merge candidate list is less than MaxAffineAmvpListSize, zero motion vectors with zero reference indices are used as the MVPs of all control points, until the list is full.

After CPMVP of the current affine CU are determined, affine motion estimation is applied and the control point motion vector (CPMV) is found. Then the difference of the CPMVs and the CPMVP is signalled in the bitstream.

Figure 16B:
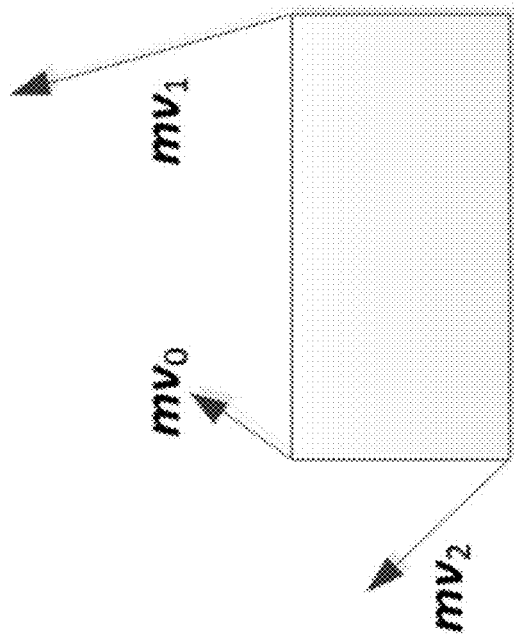
FIGS. 16A and 16B show a 4-parameter affine model and a 6-parameter affine model respectively.
Figure 16A:
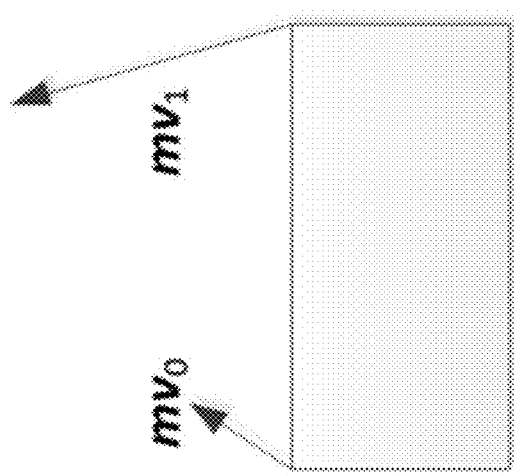

In AF_INTER mode, when 4/6 parameter affine mode is used, ⅔ control points are required, and therefore ⅔ MVD needs to be coded for these control points, as shown in FIG. 16A. In an example, it is proposed to derive the MV as follows, i.e., $mvd_1$ and $mvd_2$ are predicted from $mvd_0$.

$$mv_0 = \overline{mv}_0 + mvd_0$$

$$mv_1 = \overline{mv}_1 + mvd_1 + mvd_0$$

$$mv_2 = \overline{mv}_2 + mvd_2 + mvd_0$$

Wherein $mv_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 16B. The addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.2.3.2. Fast Affine ME Algorithm in AF_INTER Mode

In affine mode, MV of 2 or 3 control points needs to be determined jointly. Directly searching the multiple MVs jointly is computationally complex. A fast affine ME algorithm is proposed and is adopted into VTM/BMS.

The fast affine ME algorithm is described for the 4-parameter affine model, and the idea can be extended to 6-parameter affine model.

$$\begin{cases} x' = ax + by + c \\ y' = -bx + ay + d \end{cases} \quad (2)$$

$$\begin{cases} mv^h_{(x,y)} = x' - x = (a-1)x + by + c \\ mv^v_{(x,y)} = y' - y = -bx + (a-1)y + d \end{cases} \quad (3)$$

Replace (a−1) with a', then the motion vector can be rewritten as:

$$\begin{cases} mv^h_{(x,y)} = x' - x = a'x + by + c \\ mv^v_{(x,y)} = y' - y = -bx + a'y + d \end{cases} \quad (4)$$

Suppose motion vectors of the two controls points (0, 0) and (0, w) are known, from Equation (5), the affine parameters can be derived as follows:

$$\begin{cases} c = mv^h_{(0,0)} \\ d = mv^v_{(0,0)} \end{cases} \quad (5)$$

The motion vectors can be rewritten in vector form as:

$$MV(p) = A(P) * MV_C^T \quad (6)$$

Wherein $$A(P) = \begin{bmatrix} 1 & x & 0 & y \\ 0 & y & 1 & -x \end{bmatrix} \quad (7)$$

$$MV_C = \begin{bmatrix} mv^h_{(0,0)} & a & mv^v_{(0,0)} & b \end{bmatrix} \quad (8)$$

P=(x, y) is the pixel position.

At encoder, MVD of AF_INTER are derived iteratively. Denote $MV^i(P)$ as the MV derived in the ith iteration for position P and denote $dMV_C^i$ as the delta updated for $MV_C$ in the ith iteration. Then in the (i+1)th iteration, $$MV^{i+1}(P) = A(P) * \left((MV_C^i)^T + (dMV_C^i)^T\right) = \qquad (9)$$
$$A(P)*(MV_C^i)^T + A(P)*(dMV_C^i)^T = MV^i(P) + A(P)*(dMV_C^i)^T$$

Denote $Pic_{ref}$ as the reference picture and denote $Pic_{cur}$ as the current picture and denote $Q = P + MV^i(P)$. Suppose MSE is used as the matching criterion, then the following expression can be written:

$$\min \sum_P (Pic_{cur}(P) - Pic_{ref}(P + MV^{i+1}(P)))^2 = \qquad (10)$$
$$\min \sum_P (Pic_{cur}(P) - Pic_{ref}(Q + A(P)*(dMV_C^i)^T))^2$$

Suppose $(dMV_C^i)^T$ is small enough, $Pic_{ref}$ $(Q+A(P)*(dMV_C^i)^T)$ can be approximately rewritten as follows with lth order Taylor expansion:

$$Pic_{ref}(Q + A(P)*(dMV_C^i)^T) \approx Pic_{ref}(Q) + Pic'_{ref}(Q)*A(P)*(dMV_C^i)^T \qquad (11)$$

Wherein $Pic'_{ref}(Q) = \left[\dfrac{dPic_{ref}(Q)}{dx} \dfrac{dPic_{ref}(Q)}{dy}\right]$. Denote $E^{i+1}(P) = Pic_{cur}(P) - Pic_{ref}(Q)$, $$\min \sum_P (Pic_{cur}(P) - Pic_{ref}(Q) - Pic'_{ref}(Q)*A(P)*(dMV_C^i)^T)^2$$
$$\min \sum_P (E^{i+1}(P) - Pic'_{ref}(Q)*A(P)*(dMV_C^i)^T)^2. \qquad (12)$$

$dMV_C^i$ can be derived by setting the derivative of the error function to zero. Then, delta MV of the control points (0, 0) and (0, w) can be calculated according to $A(P)*(dMV_C^i)^T$, $$dMV_{(0,0)}^h = dMV_C^i[0] \qquad (13)$$
$$dMV_{(0,w)}^h = dMV_C^i[1]*w + dMV_C^i[2] \qquad (14)$$
$$dMV_{(0,0)}^v = dMV_C^i[2] \qquad (15)$$
$$dMV_{(0,w)}^v = -dMV_C^i[3]*w + dMV_C^i[2] \qquad (16)$$

Suppose such MVD derivation process is iterated by n times, then the final MVD is calculated as follows, $$fdMV_{(0,0)}^h = \Sigma_{i=0}^{n-1} dMV_C^i[0] \qquad (17)$$
$$fdMV_{(0,w)}^h = \Sigma_{i=0}^{n-1} dMV_C^i[1]*w + \Sigma_{i=0}^{n-1} dMV_C^i[0] \qquad (18)$$
$$fdMV_{(0,0)}^v = \Sigma_{i=0}^{n-1} dMV_C^i[2] \qquad (19)$$
$$fdMV_{(0,w)}^v = \Sigma_{i=0}^{n-1} dMV_C^i[3]*w + \Sigma_{i=0}^{n-1} dMV_C^i[2] \qquad (20)$$

In an example, i.e., predicting delta MV of control point (0, w), denoted by $mvd_1$ from delta MV of control point (0, 0), denoted by $mvd_0$, now actually only $(\Sigma_{i=0}^{n-1} dMV_C^i[1]*w, -\Sigma_{i=0}^{n-1} -dMV_C^i[3]*w)$ is encoded for $mvd_1$.

2.2.3.3. Sub-Block Merge Mode

Sub-block merge candidate list is constructed with following steps:
1) Insert ATMVP candidate.
2) Insert inherited affine merge candidates Inherited affine merge candidate means that the candidate is derived from the affine motion model of its valid neighbor affine coded block. At most 2 candidates may be derived in this step. As shown in FIG. 15, A0, A1 are checked to generate the first candidate, and B0, B1, B2 are checked to generate the second candidate.

For each available candidate, its affine parameter is used to derive CPMVP, and the CPMVP is inserted into the sub-block merge list.

3) Insert constructed affine merge candidates

If the number of candidates in sub-block merge candidate list is less than MaxNumAffineCand (set to 5 in this contribution), constructed affine merge candidates are inserted into the candidate list. Constructed affine merge candidate means the candidate is constructed by combining the neighbor motion information of each control point.

The motion information for the control points is derived firstly from the specified spatial neighbors and temporal neighbor shown in FIG. 15. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}).

Motion information of two control points are needed to construct a 4-parameter affine candidate. The two control points can be selected from one of the following two combinations ({CP1, CP2}, {CP1, CP3}).

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}.

For reference list X (X being 0 or 1) of a combination, if different control points use same reference picture, such combination is considered as "available", otherwise, it is considered as "unavailable".

4) Padding with zero motion vectors

If the number of candidates in sub-block merge candidate list is less than 5, zero motion vectors with zero reference indices are insert into the candidate list, until the list is full.

2.3. Regression-Based Motion Vector Field

Regression-based Motion Vector Field (RMVF) based sub-block motion vector derivation is proposed in an example. This tool attempts to model the motion vectors of each block on a sub-block level based on the spatially neighboring motion vectors.

Figure 17:
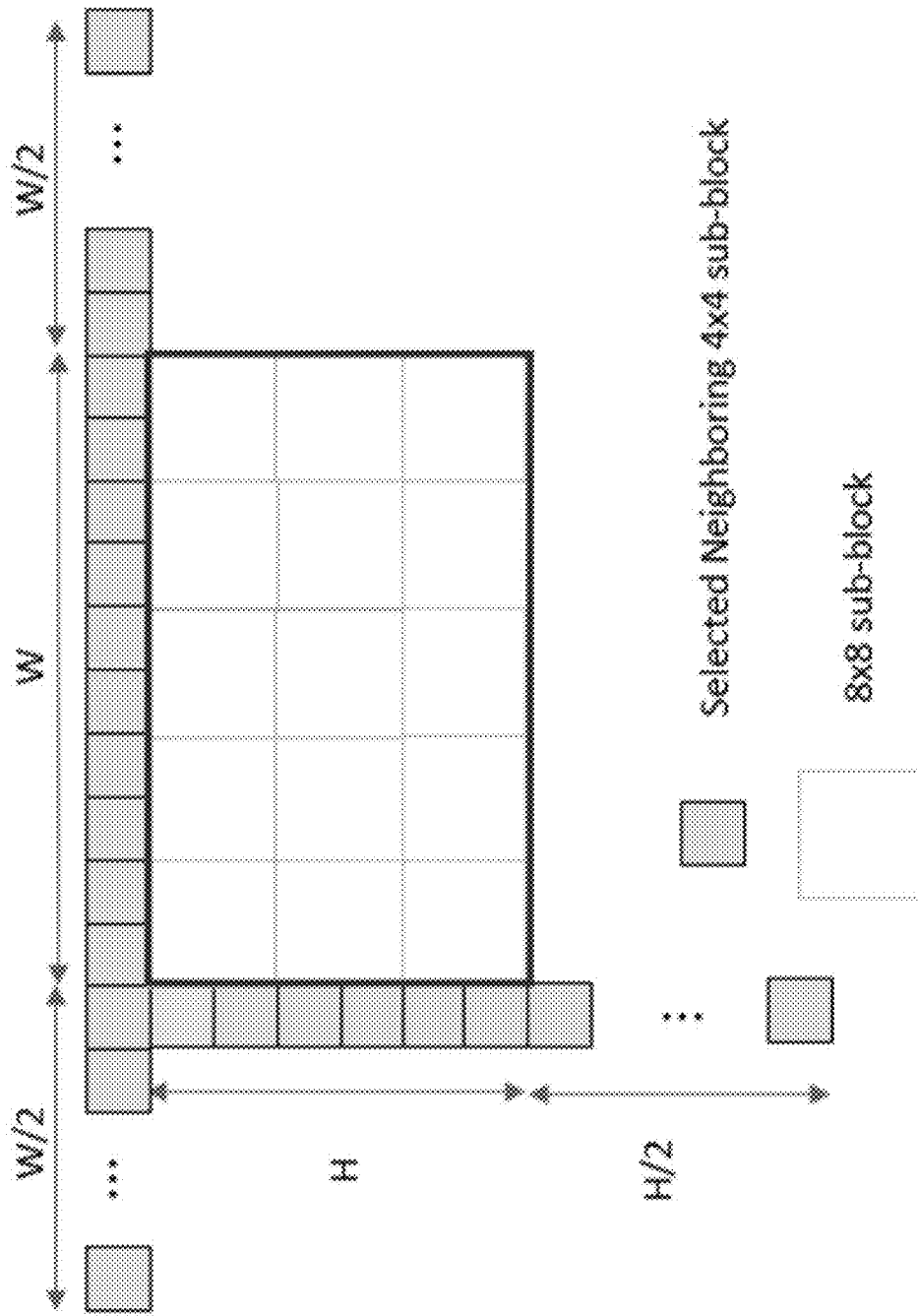
FIG. 17 shows an example of neighboring motion vectors used in derivation of RMVF motion information.

FIG. 17 illustrates the neighboring 4×4 motion blocks that are used for motion parameter derivation of the proposed method. As seen, one line and row of immediate neighboring motion vectors in 4×4 sub-block basis (and their center locations) from each side of the block are used in the regression process.

Figure 18:
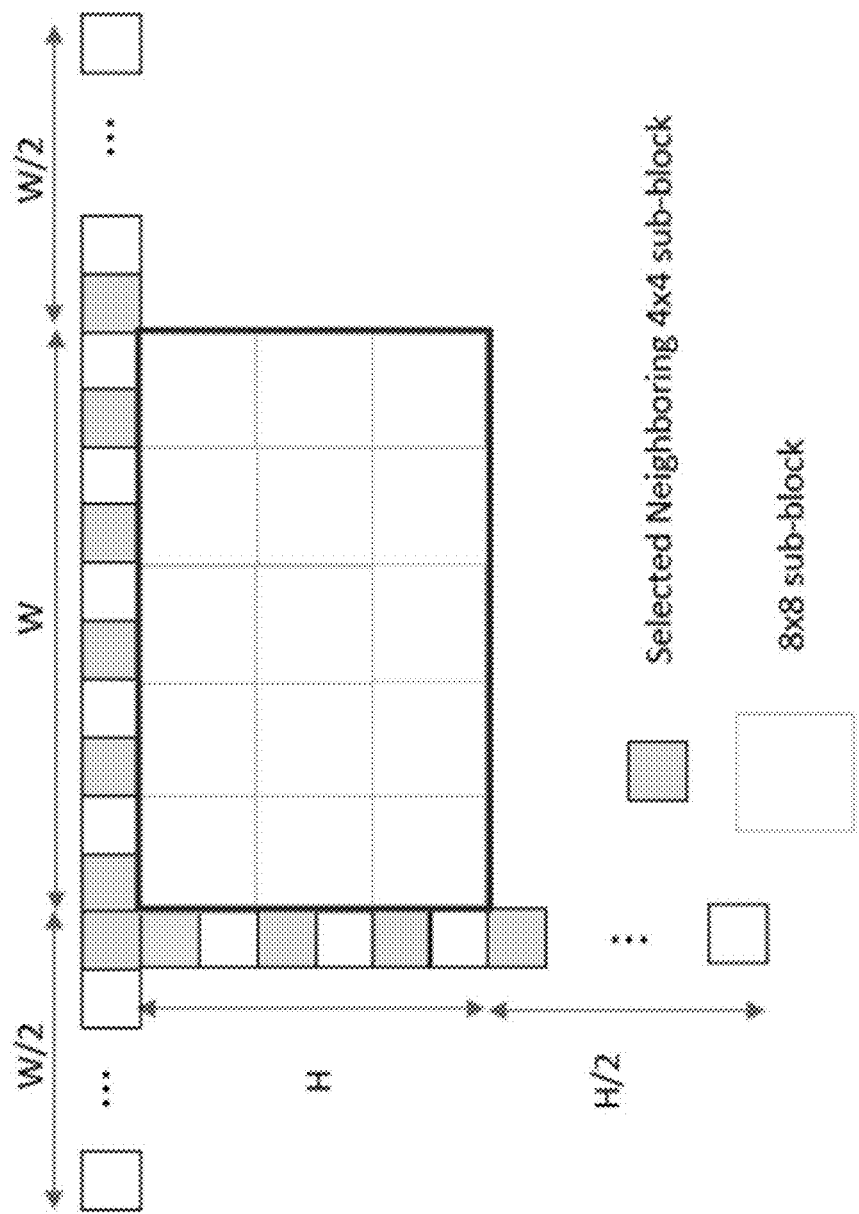
FIG. 18 shows an example of a reduced set of neighboring motion vectors used in derivation of RMVF motion information.

In order to reduce the number of neighboring motion information for RMVF parameter derivation, the method of FIG. 18 is used in which almost half of the neighboring 4×4 motion blocks are used for motion parameter derivation.

Five conventional regions (bottom-left, left, top-left, top, top-right) as shown in the figures are used when collecting the motion information for motion parameter derivation. The above-right (with W/2 length) and bottom-left (with H/2 length) reference motion regions are limited to only half of the corresponding width or height of the current block.

In RMVF mode, motion of the block is defined by a 6-parameter motion model. These parameters $a_{xx}$, $a_{xy}$, $a_{yx}$, $a_{yy}$, $b_x$ and $b_y$ are calculated by solving a linear regression model in mean square error (MSE) sense. The input to the regression model consists of the center locations (x, y) and motion vectors ($mv_x$ and $mv_y$) of the available neighboring 4×4 sub-blocks as defined above.

Motion vector ($MV_{X\_subPU}$, $MV_{Y\_subPU}$) for an 8×8 sub-block with center location at ($X_{subPU}$, $Y_{subPU}$) is then calculated as:

$$\begin{bmatrix} MV_{X\_subPU} \\ MV_{Y\_subPU} \end{bmatrix} = \begin{bmatrix} a_{xx} & a_{xy} \\ a_{yx} & a_{yy} \end{bmatrix} \begin{bmatrix} X_{subPU} \\ Y_{subPU} \end{bmatrix} + \begin{bmatrix} b_x \\ b_y \end{bmatrix} \quad (21)$$

The motion vectors are calculated for 8×8 sub-blocks relative to the center location of each sub-block. Consequently, motion compensation is also applied in 8×8 sub-block accuracy in the RMVF mode.

For efficient modelling of the motion information (e.g., the motion vector field), RMVF can be applied only in the cases that at least one motion vector from at least three of the candidate regions are available.

Further details:

The minimum coding unit size for RMVF mode is 8×8

Decision for uni- or bi-directional prediction is done based on the picture type (P/B picture) and availability of neighboring motion information for that prediction direction.

Reference index in both prediction directions is set to 0.

When calculating the motion parameters, the conventional motion vector scaling used in VTM-3.0 is applied to the motion vectors that have different reference pictures than the current block.

The sub-block motion compensation is done as in VTM-3.0 (i.e., 8×8 sub-block size).

3. Drawbacks of Existing RMVF Implementations

The current RMVF method may have the following problems:
1. It cannot be applied to affine inter mode.
2. It uses neighboring motion vectors for derivation of the affine parameters. For small resolution sequences like WVGA, WQVGA or 1080P sequences or small block sizes, few available MVs are available for a block and RMVF may be inefficient.
3. Only 6-parameter affine parameters are derived.

4. Example Techniques and Embodiments

The detailed embodiments described below should be considered as examples to explain general concepts. These embodiments should not be interpreted narrowly way. Furthermore, these embodiments can be combined in any manner.

The RMVF embodiments described below can represent the technology described in section 2.3, or any variances of the RMVF or any coding tools that rely on a neighboring block's motion information to derive a motion model for coding a current block.

1. RMVF may utilize motion information from non-adjacent blocks.
   a. In one example, RMVF may utilize coded information from temporal blocks located in reference pictures.
   b. Alternatively, furthermore, non-adjacent blocks shall be within the same CTU.
   c. Alternatively, furthermore, non-adjacent blocks shall be within the same CTU row.
   d. In one example, which neighboring/non-adjacent/temporal blocks to be utilized may be changed from block to block.
   e. In one example, whether to utilize non-adjacent/temporal blocks in RMVF may depend on the availability of motion information from neighboring blocks.
2. RMVF may be utilized for the inter affine mode wherein some control point predictors may be derived from RMVF.
   a. In one example, RMVF method may be used to derive CPMVPs and the derived CPMVPs (i.e., RMVF affine AMVP candidates) may be inserted into the exiting affine AMVP list.
      i. Alternatively, a new affine AMVP list may be constructed according to the derived CPMVPs from RMVF. Alternatively, furthermore, whether to use the exiting affine AMVP list with candidates derived from RMVF or use separate affine AMVP lists may be explicitly or implicitly signaled in block/CU/CTU/tile level.
   b. In one example, 4-parameter affine parameter may be derived by RMVF and may be used to generate CPMVP for all control points of the block.
   c. In one example, 6-parameter affine parameter may be derived by RMVF and may be used to generate CPMVP for all control points of the block.
   d. In one example, more than one set of 4-parameter affine parameter or/and 6-parameter affine parameter may be derived by RMVF by using different sets of neighboring adjacent or/and non-adjacent MVs.
   e. In one example, CPMVPs derived by RMVF may be inserted before the inherited affine AMVP candidates.
   f. In one example, CPMVPs derived by RMVF may be inserted after certain inherited affine AMVP candidates or all inherited affine candidates.
      i. Alternatively, furthermore, before the constructed affine AMVP candidates.
      ii. CPMVPs derived by RMVF may be interleaved with the inherited affine AMVP candidates.
   g. In one example, CPMVP derived by RMVF may be inserted after certain constructed affine AMVP candidates or all constructed affine AMVP candidates.
      i. Alternatively, furthermore, before the zero MVs.
      ii. CPMVPs derived by RMVF may be interleaved with the constructed affine AMVP candidates.
   h. CPMVPs derived by RMVF may be interleaved with the zero MVs.

3. RMVF method may be used to derive CPMVP and the derived CPMVP (i.e., RMVF affine merge candidates) may be inserted into the sub-block merge list/affine merge list.
   a. In one example, 4-parameter affine parameter may be derived by RMVF. Alternatively, furthermore, those parameters may be used to generate CPMVP for all control points of the block.
   b. In one example, 6-parameter affine parameter may be derived by RMVF. Alternatively, furthermore, those parameters may be used to generate CPMVP for all control points of the block.
   c. In one example, more than one set of 4-parameter affine parameter or/and 6-parameter affine parameter may be derived by RMVF by using different sets of neighboring adjacent or/and non-adjacent MVs.
   d. In one example, the prediction direction of the RMVF affine merge candidates may depend on the slice type.
      i. For example, the prediction direction may be the list 0 for P slice.
      ii. For example, the prediction direction may be list 0 and list 1 for B slice.
   e. In one example, reference picture of the RMVF affine merge candidates may be always the first reference picture in each reference list.
      i. Alternatively, reference picture of the RMVF affine merge candidates may be signaled in VPS/SPS/PPS/tile group header/tile header/slice header etc.
   f. In one example, CPMVPs derived by RMVF may be inserted before the inherited affine merge candidates.
   g. In one example, CPMVPs derived by RMVF may be inserted after certain inherited affine merge candidates or all inherited affine merge candidates.
      i. Alternatively, furthermore, before the constructed affine merge candidates.
      ii. CPMVPs derived by RMVF may be interleaved with the inherited affine merge candidates.
   h. In one example, CPMVP derived by RMVF may be inserted after certain constructed affine merge candidates or all constructed affine merge candidates.
      i. Alternatively, furthermore, before the zero MVs.
      ii. CPMVPs derived by RMVF may be interleaved with the constructed affine merge candidates.
   i. CPMVPs derived by RMVF may be interleaved with the zero MVs.
4. Motion information (such as CPMVs from previously coded blocks) and/or affine model parameters stored in HMVP lookup table may be used to derive affine parameters using RMVF method.
   a. Alternatively, an independent MV lookup table (called RMVF lookup table), similar with HMVP lookup table, may be maintained for RMVF.
   b. In one example, neighboring adjacent or/and non-adjacent MVs or/and MVs stored in HMVP lookup table or/and MVs stored in RMVF lookup table may be used to derive affine parameters using RMVF method.
   c. In one example, only MVs stored in RMVF lookup table may be used to derive affine parameters using RMVF method.
   d. In one example, only MVs stored in HMVP lookup table may be used to derive affine parameters using RMVF method.
5. Motion information of neighboring or/and non-adjacent blocks, or/and motion information stored in HMVP lookup tables or/and motion information stored in RMVF lookup tables may be used to reorder affine motion candidates in a candidate list, such as the affine merge candidate list.
   a. In one example, for each affine merge candidate, affine parameters of it is used to derive MVs of K (K>=1) neighboring adjacent or/and non-adjacent positions. The distance between the derived MVs (DMV) and the signaled MVs (SMV) is calculated for these positions, denoted as $dist_i$ for position i (i<=K). A cost value is calculated based on $dist_i$, e.g., cost=f($dist_i$, ..., $dist_K$). The affine merge candidates may be arranged in ascending order of the cost value.
   b. In one example, distance between the DMV and the SMV may be defined as sum of the square difference of DMV and SMV as follows:

$$dist(DMV,SMV)=(DMV_x-SMV_x)^2+(DMV_y-SMV_y)^2.$$

Wherein $Mv_x$ and $Mv_y$ are the horizontal and vertical component of Mv.
   c. In one example, distance between the DMV and the SMV may be defined as sum of the absolute difference of DMV and SMV as follows:

$$dist(DMV,SMV)=|DMV_x-SMV_x|+|DMV_y-SMV_y|.$$

d. In one example, the cost value is defined as the sum of $dist_i$.
   e. In one example, fixed neighboring adjacent or/and non-adjacent positions are predefined and used.
      i. If block in a position is not coded with inter mode, it may be considered as "unavailable" and is not used.
      ii. In one example, non-adjacent positions may be the positions of the MVs stored in HMVP lookup table or/and RMVF lookup table.
   f. If the prediction direction or/and reference picture of the affine merge candidate is different from a neighboring block, MV scaling may be performed to generate the derived MV. The MV scaling process may depend on the POC (picture order count) of reference pictures of the affine merge candidate, and POC of reference pictures of the neighboring block.
6. If a neighboring adjacent or/and non-adjacent MV refer to a different reference picture from the target reference picture, it may be considered as "unavailable" and may be not used in RMVF derivation.
7. RMVF may be enabled/disabled according to the rule on block dimension.
   a. In one example, when a block size contains less than M*H samples, e.g., 16 or 32 or 64 luma samples, RMVF is not allowed.
   b. In one example, when a block size contains more than M*H samples, e.g., 16 or 32 or 64 luma samples, RMVF is not allowed.
   c. Alternatively, when minimum size of a block's width or/and height is smaller than or no larger than X, RMVF is not allowed. In one example, X is set to 8.
   d. Alternatively, when a block's width >th1 or >=th1 and/or a block's height >th2 or >=th2, RMVF is not allowed. In one example, X is set to 64.
      i. For example, RMVF is disabled for M×M (e.g., 128×128) block.
      ii. For example, RMVF is disabled for N×M/M×N block, e.g., wherein N>=64, M=128.
      iii. For example, RMVF is disabled for N×M/M×N block, e.g., wherein N>=4, M=128.

e. Alternatively, when a block's width <th1 or <=th1 and/or a block's height <th2 or <=th2, RMVF is not allowed. In one example, th1 and/or th2 is set to 8.
8. Indications to tell whether proposed method is enabled or not may be signaled in PPS/VPS/picture header/slice header/tile group header/CTU groups.
   a. In one example, if separate tree partition structure (e.g., dual tree) is applied, the indications may be signaled more than once for one picture/slice/tile group/CTU.
   b. In one example, if separate tree partition structure (e.g., dual tree) is applied, the indications may be signaled separately for different color components.
      i. Alternatively, the indications may be signaled only for one color component and may be applied for all other color components.

5. Example Implementations of the Disclosed Technology

Figure 19:
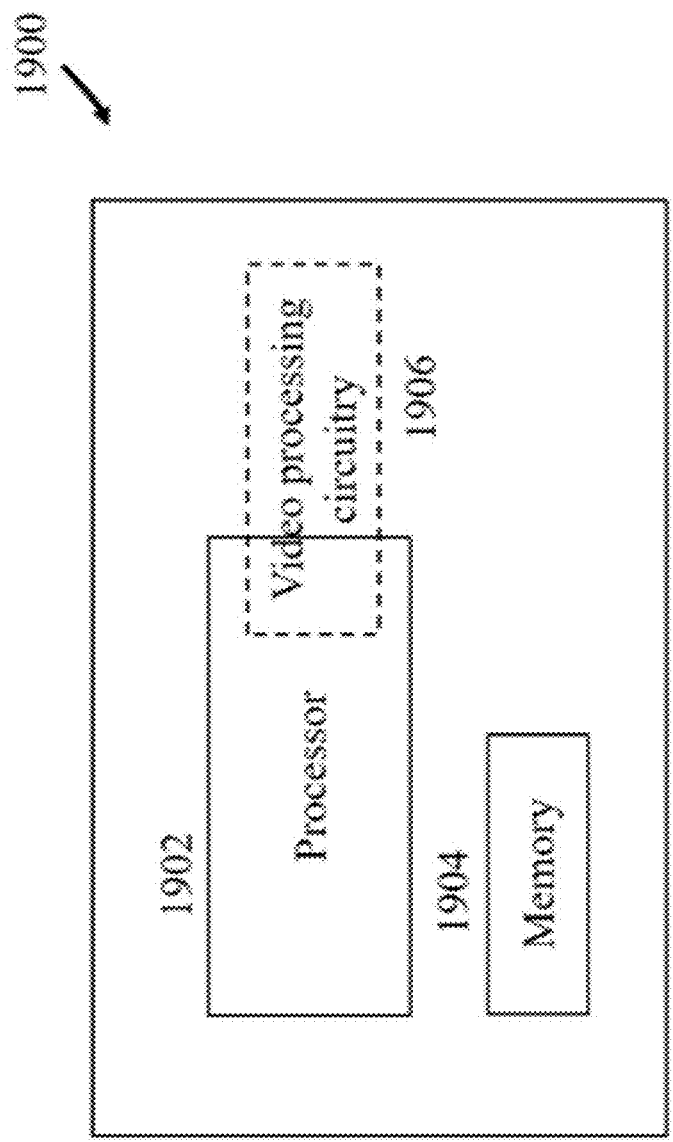
FIG. 19 is a block diagram of an example of a hardware platform for implementing a visual media decoding or a visual media encoding technique described in the present document.

FIG. 19 is a block diagram of a video processing apparatus 1900. The apparatus 1900 may be used to implement one or more of the methods described herein. The apparatus 1900 may be embodied in a smartphone, tablet, computer, Internet of Things (IoT) receiver, and so on. The apparatus 1900 may include one or more processors 1902, one or more memories 1904 and video processing hardware 1906. The processor(s) 1902 may be configured to implement one or more methods described in the present document. The memory (memories) 1904 may be used for storing data and code used for implementing the methods and techniques described herein. The video processing hardware 1906 may be used to implement, in hardware circuitry, some techniques described in the present document, and may be partly or completely be a part of the processors 1902 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 20:
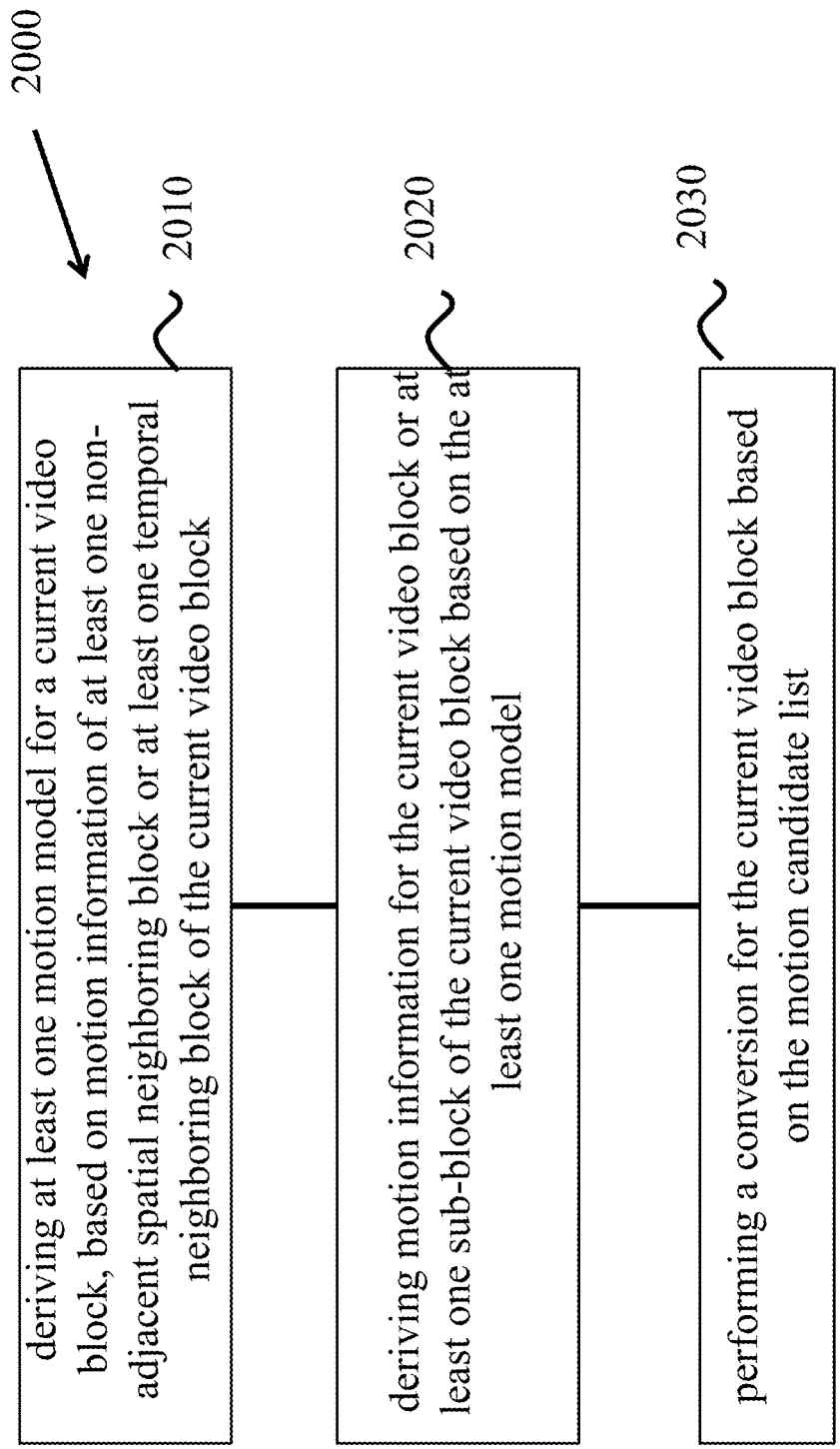
FIG. 20 illustrates a flowchart of an example method for video processing.

FIG. 20 is a flowchart for an example method 2000 of video processing. The method 2000 includes, at 2010, deriving at least one motion model for a current video block, based on motion information of at least one non-adjacent spatial neighboring block or at least one temporal neighboring block of the current video block. The method further includes, at 2020, deriving motion information for the current video block or at least one sub-block of the current video block based on the at least one motion model; and at 2030, performing a conversion for the current video block based on the derived motion information.

Figure 21:
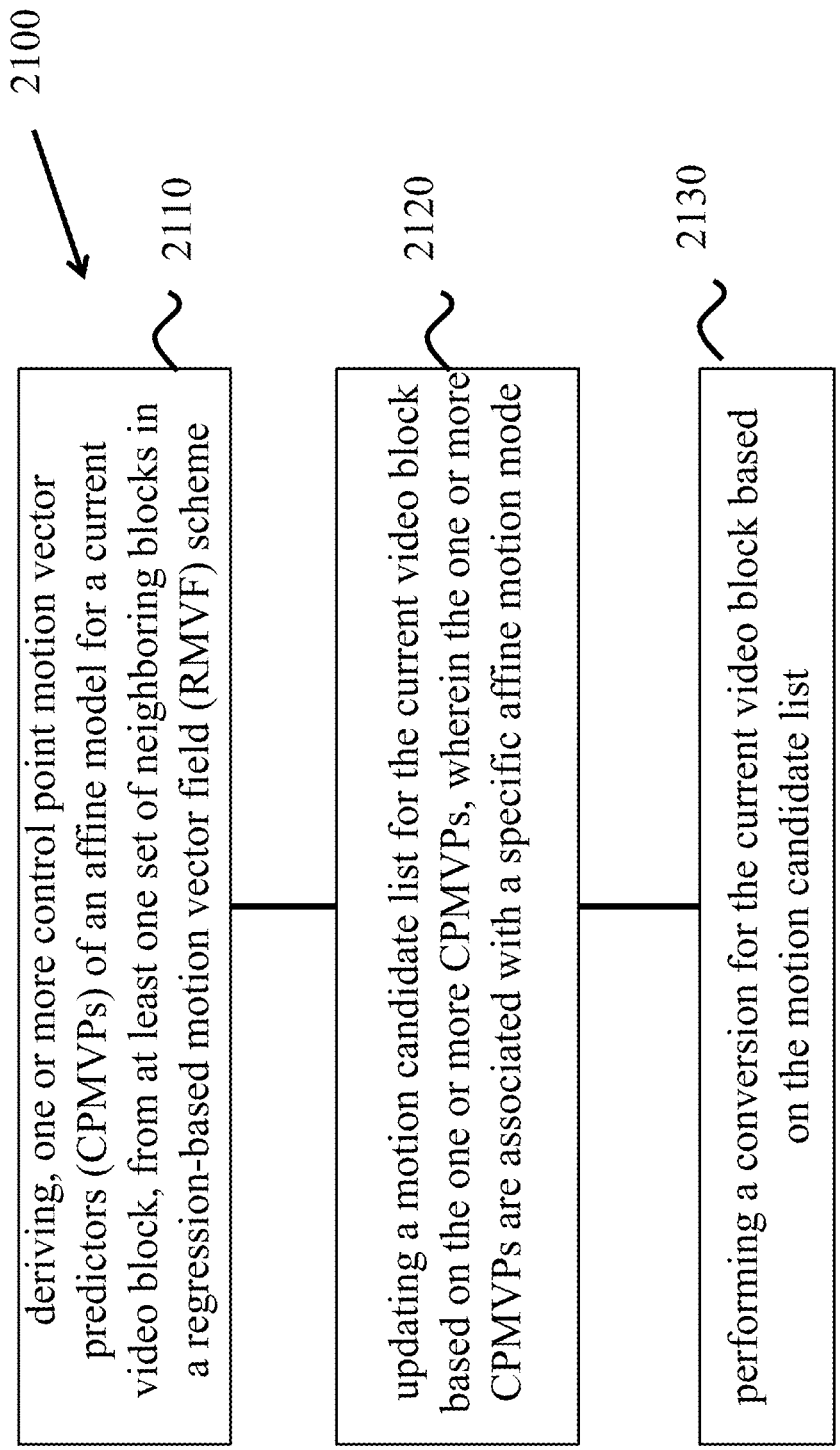
FIG. 21 illustrates a flowchart of another example method for video processing.

FIG. 21 is a flowchart for an example method 2100 of video processing. The method 2100 includes, at 2110, deriving, one or more control point motion vector predictors (CPMVPs) of an affine model for a current video block, from at least one set of neighboring blocks in a regression-based motion vector field (RMVF) scheme; at 2120, updating a motion candidate list for the current video block based on the one or more CPMVPs, wherein the one or more CPMVPs are associated with a specific affine motion mode; and at 2130, performing a conversion for the current video block based on the motion candidate list.

Figure 22:
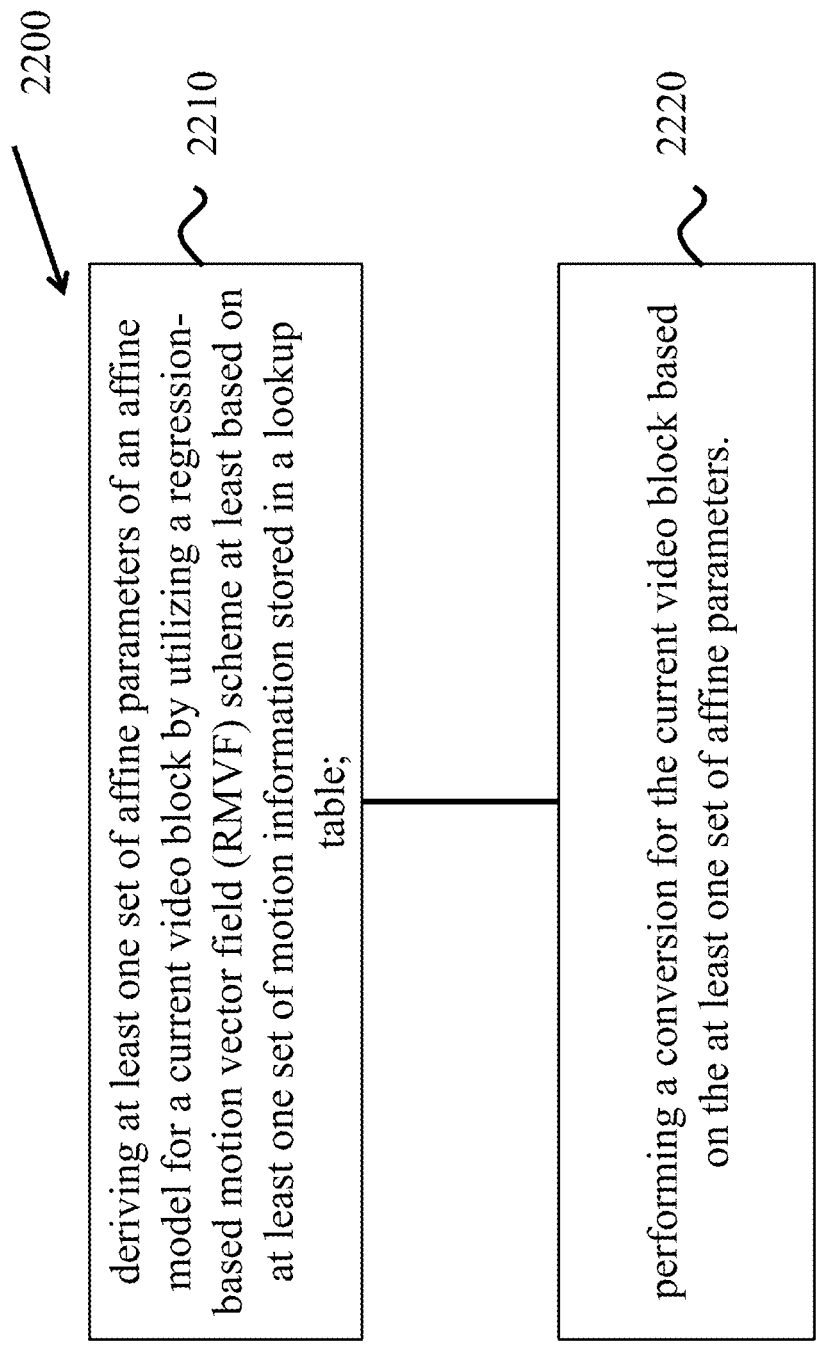
FIG. 22 illustrates a flowchart of another example method for video processing.

FIG. 22 is a flowchart for an example method 2200 of video processing. The method 2200 includes, at 2210, deriving at least one set of affine parameters of an affine model for a current video block by utilizing a regression-based motion vector field (RMVF) scheme at least based on at least one set of motion information stored in a lookup table; and at 2220, performing a conversion for the current video block based on the at least one set of affine parameters.

Figure 23:
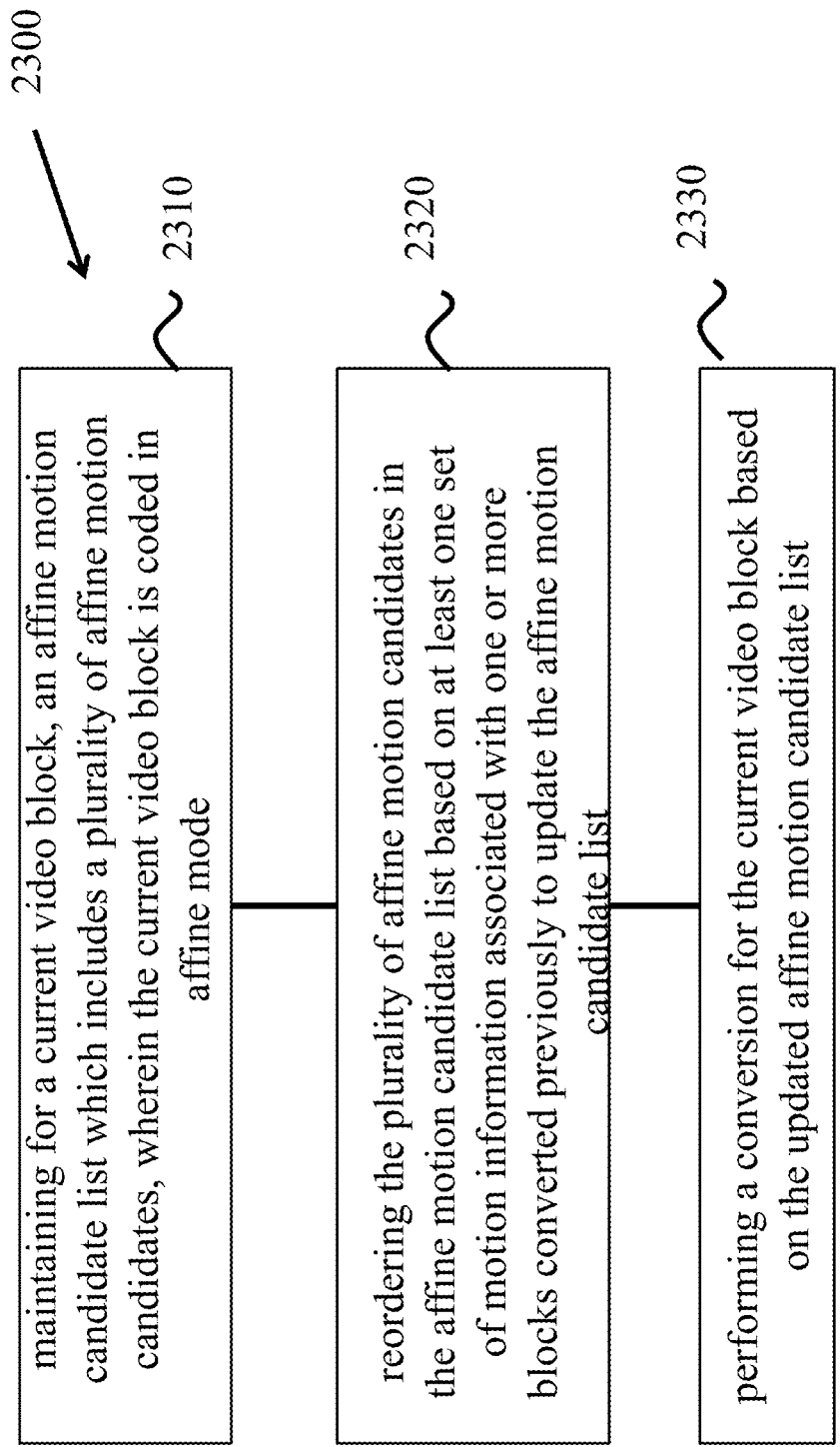
FIG. 23 illustrates a flowchart of another example method for video processing.

FIG. 23 is a flowchart for an example method 2300 of video processing. The method 2300 includes, at 2310, maintaining for a current video block, an affine motion candidate list which includes a plurality of affine motion candidates, wherein the current video block is coded in affine mode; at 2320, reordering the plurality of affine motion candidates in the affine motion candidate list based on at least one set of motion information associated with one or more blocks converted previously to update the affine motion candidate list; and at 2330, performing a conversion for the current video block based on the updated affine motion candidate list.

Some embodiments may be described using the following examples.

In one aspect, there is disclosed a method for video processing, comprising: deriving at least one motion model for a current video block, based on motion information of at least one non-adjacent spatial neighboring block or at least one temporal neighboring block of the current video block; deriving motion information for the current video block or at least one sub-block of the current video block based on the at least one motion model; and performing a conversion for the current video block based on the derived motion information.

In an example, the motion model comprises a 4-parameter affine model.

In an example, the motion model comprises a 6-parameter affine model.

In an example, the motion model is derived using a regression-based vector field (RMVF) scheme.

In an example, the at least one temporal neighboring block is located in at least one of reference pictures.

In an example, the at least one non-adjacent spatial neighboring block is located within a same coding tree unit (CTU) as the current video block.

In an example, the at least one non-adjacent spatial neighboring block is located within a same coding tree unit (CTU) row as the current video block.

In an example, the at least one non-adjacent spatial neighboring and the at least one temporal neighboring block are determined based on a characteristic of the current video block.

In an example, whether the at least one non-adjacent spatial neighboring block or the at least one temporal neighboring block is used for deriving the at least one motion model depends on the availability of motion information of one or more adjacent spatial neighboring blocks of the current video block.

In an example, whether a regression-based vector field (RMVF) scheme is enabled to derive the at least one motion model depends on a block dimension of the current video block.

In an example, the RMVF scheme is disabled if the block dimension of the current video block satisfies at least one of the following:
  an amount of samples contained in the current video block is less than a first threshold;
  a minimum size of a height and width of the current video block is not more than a second threshold;
  the height of the current video block is not more than a third threshold; and
  the width of the current video block is not more than a fourth threshold.

In an example, the first threshold is equal to one of 16, 32 and 64.

In an example, the second threshold is equal to 8.

In an example, at least one of the third and fourth thresholds is equal to 8.

In an example, the RMVF scheme is disabled if the block dimension of the current video block satisfies at least one of the following:
  an amount of samples contained in the current video block is more than a fifth threshold;
  a height of the current video block is not less than a sixth threshold; and
  a width of the current video block is not less than a seventh threshold.

In an example, the fifth threshold is equal to one of 16, 32 and 64.

In an example, at least one of the sixth and seventh thresholds is equal to 64.

In an example, the RMVF scheme is disabled if the current video block has a size of M×M, M×N or N×M, wherein M=128, and N=64 or 4.

In an example, whether a regression-based vector field (RMVF) scheme is enabled to derive the at least one motion model depends on an indication signaled in at least one of a video parameter set (VPS), a picture parameter set (PPS), a picture header, a slice header, a tile group header and CTU groups.

In an example, the indication is signaled more than once for at least one of a picture, slice, tile group and CTU which covers the current video block if separate tree partition structures are applied to the current video block.

In an example, the indication is signaled separately for different color components of the current video block if the separate tree partition structures are applied to the different color components.

In an example, the at least one non-adjacent spatial neighboring block or the at least one temporal neighboring block exclude any neighboring block whose motion vector refers to a different reference picture from a target reference picture.

In another aspect, there is disclosed a method for video processing, comprising: deriving, one or more control point motion vector predictors (CPMVPs) of an affine model for a current video block, from at least one set of neighboring blocks in a regression-based motion vector field (RMVF) scheme; updating a motion candidate list for the current video block based on the one or more CPMVPs, wherein the one or more CPMVPs are associated with a specific affine motion mode; and performing a conversion for the current video block based on the motion candidate list.

In an example, the at least one set of neighboring blocks comprise at least one of adjacent blocks and non-adjacent blocks of the current video block.

In an example, the specific affine motion mode is an affine advanced motion vector prediction (AMVP) mode and the motion candidate list is an affine AMVP list, the one or more CPMVPs being inserted as RMVF-based affine candidates.

In an example, the affine AMVP list is selected from one of an existing affine AMVP list and a separate affine AMVP list based on an indication signaled in a level of at least one of a block, a coding unit (CU), a coding tree unit (CTU) and a tile, wherein the existing affine AMVP list comprises at least one affine AMVP candidate which is not derived in the RMVF scheme, and the separate affine AMVP list only comprises RMVF-based affine candidates.

In an example, the specific affine motion mode is an affine merge mode and the motion candidate list is an affine merge list, the one or more CPMVPs being inserted as RMVF-based affine candidates.

In an example, the affine merger list is a sub-block based affine merge list

In an example, the motion candidate list comprises one or more inherited affine candidates, and the RMVF-based affine candidates are arranged in the motion candidate list in one of following orders:
  before all of the inherited affine candidates;
  after at least one of one or more inherited affine candidates; or
  interleaved with the one or more inherited affine candidates.

In an example, the motion candidate list further comprises one or more constructed affine candidates, and the RMVF-based affine candidates are arranged in the motion candidate list in one of following orders:
  before all of the constructed affine candidates;
  after at least one of one or more constructed affine candidates; or
  interleaved with the one or more constructed affine candidates.

In an example, the motion candidate list further comprises one or more zero motion vectors (MVs), and the RMVF-based affine candidates are arranged before all zero MVs or interleaved with the zero MVs in the motion candidate list.

In an example, at least one set of affine parameters of the affine model for the current video block is determined from at least one set of neighboring blocks in the RMVF scheme to derive the one or more CPMVPs of the current video block.

In an example, more than one set of affine parameters of the affine model for the current video block are determined from different sets of neighboring blocks in the RMVF scheme to derive the one or more CPMVPs of the current video block.

In an example, the affine model is a 6-parameter affine model or a 4-parameter affine model.

In an example, each of the RMVF-based affine candidates is associated with a prediction direction which depends on a slice type.

In an example, the prediction direction corresponds to list 0 for a P-type slice.

In an example, the prediction direction corresponds to list 0 and list 1 for a B-type slice.

In an example, each of the RMVF-based affine candidates is associated with a reference picture included in a reference list.

In an example, the reference picture corresponds to a first reference picture in the reference list.

In an example, the reference picture is determined from an indication signaled in one of a video parameter set (VPS), a sequence parameter set (SPS), a picture parameter set (PPS), a tile group header, a tile header, or a slice header.

In another aspect, there is disclosed a method for video processing, comprising: deriving at least one set of affine parameters of an affine model for a current video block by utilizing a regression-based motion vector field (RMVF) scheme at least based on at least one set of motion information stored in a lookup table; performing a conversion for the current video block based on the at least one set of affine parameters.

In an example, the at least one set of affine parameters of the affine model is derived based on the at least one set of motion information stored in the lookup table and at least one set of motion information associated with at least one adjacent or non-adjacent neighboring block.

In an example, the lookup table comprises a history-based motion vector prediction (HMVP) lookup table or a RMVF lookup table which stores motion information of at least one block converted previously.

In an example, the HMVP lookup table is different from the RMVF lookup table.

In an example, information on a position and dimension of the at least block is stored together with the motion information of the at least block in the lookup table.

In an example, the set of motion information comprises at least one of control point motion vector predictors and affine model parameters.

In another aspect, there is disclosed a method for video processing, comprising: maintaining for a current video block, an affine motion candidate list which includes a plurality of affine motion candidates, wherein the current video block is coded in affine mode; reordering the plurality of affine motion candidates in the affine motion candidate list based on at least one set of motion information associated with one or more blocks converted previously to update the affine motion candidate list; and performing a conversion for the current video block based on the updated affine motion candidate list.

In an example, the plurality of affine motion candidates is associated with a 4-parameter affine motion model or a 6-parameter affine motion model.

In an example, the one or more blocks converted previously are one or more adjacent or non-adjacent neighboring blocks.

In an example, the at least one set of motion information associated with one or more blocks converted previously is stored in a lookup table.

In an example, the lookup table comprises a history-based motion vector prediction (HMVP) lookup table or a RMVF lookup table which stores at least one set of motion information of one or more blocks converted previously.

In an example, the HMVP lookup table is different from the RMVF lookup table.

In an example, information on position and dimension of one or more blocks converted previously is stored together with the at least one set of motion information in the lookup table.

In an example, the at least one set of motion information comprises at least one set of motion vectors (MVs), and the plurality of affine motion candidates is reordered based on an ascending order of a function value associated with the at least one set of MVs.

In an example, the function value is obtained as follows: deriving, from affine parameters of each of the plurality of affine motion candidates, motion vectors associated with K neighboring blocks, the derived motion vectors being represented as $DMV_i$, for i=1 to K;

determining, a difference $dist_i$ between each of the derived motion vectors $DMV_i$ and a signaled motion vector $SMV_i$ of an associated neighboring block; and obtaining the function value based on a function $f(dist_1, dist_2, \ldots, dist_K)$.

In an example, the function $f(dist_1, dist_2, \ldots, dist_K) = dist_1 + dist_2 + \ldots + dist_K$.

In an example, $dist_i = (DMV_{i\_x} - SMV_{i\_x})^2 + (DMV_{i\_y} - SMV_{i\_y})^2$, wherein $DMV_{i\_x}$ and $DMV_{i\_y}$ represent horizontal and vertical components of $DMV_i$ respectively, and $SMV_{i\_x}$ and $SMV_{i\_y}$ represent horizontal and vertical components of $SMV_i$ respectively In an example, $dist_i (DMV_i, SMV_i) = |DMV_{i\_x} - SMV_{i\_x}| + |DMV_{i\_y} - SMV_{i\_y}|$, wherein $DMV_{i\_x}$ and $DMV_{i\_y}$ represent horizontal and vertical components of $DMV_i$ respectively, and $SMV_{i\_x}$ and $SMV_{i\_y}$ represent horizontal and vertical components of $SMV_i$ respectively.

In an example, the K neighboring blocks are pre-defined and comprise at least one of adjacent neighboring blocks and non-adjacent neighboring blocks.

In an example, the set of MVs associated with the blocks stored in the lookup table.

In an example, the method further comprises: performing a scaling on the derived motion vector if the affine merge candidate has a different prediction direction and/or a different reference picture from a neighboring block.

In an example, the scaling is performed based on a picture order count (POC) of the reference picture of the affine merge candidate and POC of the reference picture of the neighboring block.

In an example, the conversion includes encoding the current video block into the bitstream representation of a video and decoding the current video block from the bitstream representation of the video.

In another aspect, there is disclosed an apparatus in a video system comprising a processor and a non-transitory memory with instructions thereon, wherein the instructions upon execution by the processor, cause the processor to implement the method described above.

In another aspect, there is disclosed a computer program product stored on a non-transitory computer readable media, the computer program product including program code for carrying out the method described above.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for video processing, comprising:
maintaining, for a current video block of a video, an affine motion candidate list which includes a plurality of affine motion candidates, wherein the current video block is coded in affine mode;
deriving one or more control point motion vector predictors (CPMVPs) of an affine motion model for the current video block from at least one set of neighboring blocks of the current video block in a regression-based motion vector field (RMVF) scheme, wherein the one or more CPMVPs are inserted in the affine motion candidate list as RMVF-based affine candidates;
updating the affine motion candidate list by reordering the plurality of affine motion candidates which are included in the affine motion candidate list, wherein the plurality of affine motion candidates which are included in the affine motion candidate list are reordered according to an ascending order of a function value of at least one set of motion vectors (MVs) of non-adjacent neighboring blocks converted previously, and wherein at least part of the MVs used for reordering affine motion candidates in the affine motion candidate list are stored in a RMVF lookup table; and
performing a conversion between the current video block and a bitstream of the video based on the updated affine motion candidate list,
wherein the affine motion candidate list further comprises one or more zero motion vectors (MVs), and the RMVF-based affine candidates are interleaved with the zero MVs in the affine motion candidate list.

2. The method of claim 1, wherein the plurality of affine motion candidates is associated with a 4-parmeter affine motion model or a 6-parameter affine motion model.

3. The method of claim 1, wherein at least part of the MVs used for recording affine motion candidates in the affine motion candidate list is stored in a history-based motion vector prediction (HMVP) lookup table.

4. The method of claim 3, wherein the HMVP lookup table is different from the RMVF lookup table.

5. The method of claim 1, wherein information on position and dimension of the non-adjacent neighboring blocks converted previously is stored together with the at least one set of MVs in the RMVF lookup table.

6. The method of claim 1, wherein the function value is obtained as follows:
deriving, from affine parameters of each of the plurality of affine motion candidates, motion vectors associated with K neighboring blocks, the derived motion vectors being represented as $DMV_i$, for i=1 to K;

determining, a difference $dist_i$ between each of the derived motion vectors $DMV_i$ and a signaled motion vector $SMV_i$ of an associated neighboring block; and obtaining the function value based on a function $f(dist_1, dist_2, \ldots, dist_K)$.

7. The method of claim 6, wherein the function $f(dist_1, dist_2, \ldots, dist_K) = dist_1 + dist_2 + \ldots + dist_K$.

8. The method of claim 6, wherein $dist_i = (DMV_{i\_x} - SMV_{i\_x})^2 + (DMV_{i\_y} - SMV_{i\_y})^2$, wherein $DMV_{i\_x}$ and $DMV_{i\_y}$ represent horizontal and vertical components of $DMV_i$ respectively, and $SMV_{i\_x}$ and $SMV_{i\_y}$ represent horizontal and vertical components of $SMV_i$ respectively.

9. The method of claim 6, wherein $dist_i (DMV_i, SMV_i) = |DMV_{i\_x} - SMV_{i\_x}| + |DMV_{i\_y} - SMV_{i\_y}|$, wherein $DMV_{i\_x}$ and $DMV_{i\_y}$ represent horizontal and vertical components of $DMV_i$ respectively, and $SMV_{i\_x}$ and $SMV_{i\_y}$ represent horizontal and vertical components of $SMV_i$ respectively.

10. The method of claim 6, wherein the K neighboring blocks are pre-defined and comprise at least one of adjacent neighboring blocks and non-adjacent neighboring blocks.

11. The method of claim 6, further comprising:
performing a scaling on the derived motion vector when the affine motion candidate has a different prediction direction and/or a different reference picture from a neighboring block.

12. The method of claim 11, wherein the scaling is performed based on a picture order count (POC) of the reference picture of the affine motion candidate and POC of the reference picture of the neighboring block.

13. The method of claim 1, wherein the conversion includes encoding the current video block into the bitstream.

14. The method of claim 1, wherein the conversion includes decoding the current video block from the bitstream.

15. An apparatus for processing video data comprising a processor and a non-transitory memory with instructions thereon, wherein the instructions upon execution by the processor, cause the processor to:
maintain, for a current video block of a video, an affine motion candidate list which includes a plurality of affine motion candidates, wherein the current video block is coded in affine mode;
derive one or more control point motion vector predictors (CPMVPs) of an affine motion model for the current video block from at least one set of neighboring blocks of the current video block in a regression-based motion vector field (RMVF) scheme, wherein the one or more CPMVPs are inserted in the affine motion candidate list as RMVF-based affine candidates;
update the affine motion candidate list by reordering the plurality of affine motion candidates which are included in the affine motion candidate list, wherein the plurality of affine motion candidates which are included in the affine motion candidate list are reordered according to an ascending order of a function value of at least one set of motion vectors (MVs) of non-adjacent neighboring blocks converted previously, wherein at least part of the MVs used for recording affine motion candidates in the affine motion candidate list are stored in a RMVF lookup table; and
perform a conversion between the current video block and a bitstream of the video based on the updated affine motion candidate list,
wherein the affine motion candidate list further comprises one or more zero motion vectors (MVs), and the RMVF-based affine candidates are interleaved with the zero MVs in the affine motion candidate list.

16. The apparatus of claim 15, wherein at least part of the MVs used for reordering affine motion candidates in the affine motion candidate list is stored in a history-based motion vector prediction (HMVP) lookup table, and wherein the HMVP lookup table is different from the RMVF lookup table.

17. The apparatus of claim 15, wherein information on position and dimension of the non-adjacent neighboring blocks converted previously is stored together with the at least one set of MVs in the RMVF lookup table.

18. A method for storing a bitstream of a video, wherein the method comprises:
maintaining, for a current video block of the video, an affine motion candidate list which includes a plurality of affine motion candidates, wherein the current video block is coded in affine mode;
deriving one or more control point motion vector predictors (CPMVPs) of an affine motion model for the current video block from at least one set of neighboring blocks of the current video block in a regression-based motion vector field (RMVF) scheme, wherein the one or more CPMVPs are inserted in the affine motion candidate list as RMVF-based affine candidates;
updating the affine motion candidate list by reordering the plurality of affine motion candidates which are included in the affine motion candidate list, wherein the plurality of affine motion candidates which are included in the affine motion candidate list are reordered according to an ascending order of a function value of at least one set of motion vectors (MVs) of non-adjacent neighboring blocks converted previously, and wherein at least part of the MVs used for recording affine motion candidates in the affine motion candidate list are stored in a RMVF lookup table;
generating the bitstream based on the updated affine motion candidate list, and
storing the bitstream in a non-transitory computer-readable recording medium,
wherein the affine motion candidate list further comprises one or more zero motion vectors (MVs), and the RMVF-based affine candidates are interleaved with the zero MVs in the affine motion candidate list.

19. The method of claim 18, wherein at least part of the MVs used for reordering affine motion candidates in the affine motion candidate list is stored in a history-based motion vector prediction (HMVP) lookup table, and wherein the HMVP lookup table is different from the RMVF lookup table.

20. The method of claim 18, wherein information on position and dimension of the non-adjacent neighboring blocks converted previously is stored together with the at least one set of MVs in the RMVF lookup table.

\* \* \* \* \*